United States Patent
Vong

(10) Patent No.: US 9,990,059 B2
(45) Date of Patent: Jun. 5, 2018

(54) INK MODES

(71) Applicant: Microsoft Technology Licensing, LLC, Redmond, WA (US)

(72) Inventor: William H. Vong, Hunts Point, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/665,282

(22) Filed: Mar. 23, 2015

(65) Prior Publication Data

US 2015/0338938 A1 Nov. 26, 2015

Related U.S. Application Data

(60) Provisional application No. 62/002,648, filed on May 23, 2014.

(51) Int. Cl.
*G06F 3/0354* (2013.01)
*G06F 3/038* (2013.01)
(Continued)

(52) U.S. Cl.
CPC .......... *G06F 3/03545* (2013.01); *G06F 3/013* (2013.01); *G06F 3/038* (2013.01);
(Continued)

(58) Field of Classification Search
CPC .. G06F 3/0219; G06F 3/0481; G06F 3/04883; G06F 3/0213; G06F 3/038; G06F 1/1601; G06F 1/181; G06F 2200/1612; G06F 3/1423; G06F 3/0482; G06F 3/0202; G06F 3/1431; G06F 2203/04804; G06F 2203/048; G06F 3/03543; G06F 3/03547;
(Continued)

(56) References Cited

U.S. PATENT DOCUMENTS

| | | | |
|---|---|---|---|
| 5,559,942 A * | 9/1996 | Gough | G06F 3/0481 707/E17.013 |
| 6,498,601 B1 | 12/2002 | Gujar et al. | |

(Continued)

OTHER PUBLICATIONS

"Writing Surfaces for Digital Ink", Retrieved From: <http://msdn.microsoft.com/en-us/library/ms701170(v=vs.85).aspx> May 28, 2014, Feb. 8, 2011, 3 Pages.

(Continued)

*Primary Examiner* — Kenneth Bukowski

(57) ABSTRACT

Techniques for ink modes are described. According to various embodiments, different ink modes are supported, such as a permanent ink mode, a transient ink mode, a shape recognition mode, a text recognition mode, a selection mode, a command mode, an ink note mode, an ink for emphasis mode, and so forth. For instance, embodiments support a permanent ink mode where ink applied to a document becomes part of primary content of the document. A transient ink mode is also supported in which ink applied to a document is processed according to transient ink mode behaviors. According to various embodiments, a visual affordance of a particular active ink mode is presented on a document with which a user is interacting. Further, different ink modes each are associated with different respective visual affordances.

20 Claims, 25 Drawing Sheets

(51) Int. Cl.
| | |
|---|---|
| *H04L 29/06* | (2006.01) |
| *G06F 3/01* | (2006.01) |
| *G06F 3/0484* | (2013.01) |
| *G06T 11/60* | (2006.01) |
| *G06T 11/20* | (2006.01) |
| *G06F 3/041* | (2006.01) |
| *G06F 3/0488* | (2013.01) |

(52) U.S. Cl.
CPC .......... *G06F 3/041* (2013.01); *G06F 3/04842* (2013.01); *G06F 3/04845* (2013.01); *G06F 3/04883* (2013.01); *G06T 11/203* (2013.01); *G06T 11/60* (2013.01); *H04L 65/403* (2013.01); *G06F 2203/0381* (2013.01); *G06F 2203/04807* (2013.01)

(58) Field of Classification Search
CPC ............. G06F 3/03549; G06F 3/04812; G06F 3/0489; G06F 17/241; G06F 3/033; G06F 3/04886; G06F 15/177; G06F 17/30058; G06F 3/0485; G06F 17/246; G06F 1/1616; G06F 1/1626; G06F 1/1632; G06F 1/1643; G06F 1/1684; G06F 2203/014; G06F 2203/04806; G06F 2203/04808; G06F 3/016; G06F 3/0208; G06F 3/0231; G06F 3/0238; G06F 3/0338; G06F 3/0362; G06F 3/04817; G06F 3/04; G06F 3/167; H04N 5/44543; H04N 21/482; H04N 21/4316; H04N 21/4438; H04N 21/485; H04N 21/47; H04N 7/163; H04N 21/47202; H04N 21/4884; H04N 5/44513; H04N 5/44591; H04N 21/4143; H04N 21/42204; H04N 21/431; H04N 21/4312; H04N 21/43615; H04N 21/44222; H04N 21/47211; H04N 21/4722; H04N 21/4782; H04N 21/4825; H04N 7/17318; H04N 21/422; H04N 21/4221; H04N 21/42212; H04N 21/44008; H04N 21/462; H04N 21/47205; H04N 21/6547; H04N 21/858; A63F 13/06; A63F 13/214; A63F 13/285; A63F 2300/1012; A63F 2300/1043; A63F 2300/1068; G05G 2009/04766; G05G 2009/04774; G05G 9/047; G10L 15/26; G06K 9/6293; G06T 3/0018; G06T 3/0025; B60K 2350/1012; G04G 11/00; G06Q 30/02; G06Q 30/0241; H04M 1/22; H04M 1/72566; G11B 27/034; G11B 27/105; G11B 27/34; G11B 27/36
See application file for complete search history.

(56) References Cited

U.S. PATENT DOCUMENTS

| | | | |
|---|---|---|---|
| 6,675,352 B1* | 1/2004 | Osaki ..................... | A61B 6/468 715/203 |
| 7,286,141 B2 | 10/2007 | Rieffel et al. | |
| 7,825,922 B2 | 11/2010 | Keely et al. | |
| 8,181,103 B2 | 5/2012 | Lin et al. | |
| 8,402,391 B1 | 3/2013 | Doray et al. | |
| 9,285,903 B1* | 3/2016 | Yun ........................ | G06F 3/041 |
| 2002/0024499 A1 | 2/2002 | Karidis | |
| 2003/0214536 A1 | 11/2003 | Jarrett et al. | |
| 2004/0017375 A1* | 1/2004 | Lui ....................... | G06F 17/242 345/581 |
| 2004/0257346 A1 | 12/2004 | Ong et al. | |
| 2005/0244058 A1 | 11/2005 | Gorbatov et al. | |
| 2006/0018546 A1 | 1/2006 | Lagardere et al. | |
| 2006/0212813 A1* | 9/2006 | Yalovsky ............... | G06F 17/241 715/700 |
| 2006/0215886 A1 | 9/2006 | Black | |
| 2006/0267967 A1 | 11/2006 | Hinckley et al. | |
| 2007/0046649 A1 | 3/2007 | Reiner | |
| 2007/0109281 A1 | 5/2007 | Simmons et al. | |
| 2008/0165162 A1 | 7/2008 | Zloter et al. | |
| 2009/0000831 A1 | 1/2009 | Miller et al. | |
| 2009/0027400 A1* | 1/2009 | Marggraff ........... | G06F 3/03545 345/473 |
| 2009/0231275 A1 | 9/2009 | Odgers | |
| 2009/0327501 A1 | 12/2009 | Athsani et al. | |
| 2010/0299616 A1 | 11/2010 | Chen et al. | |
| 2011/0018963 A1 | 1/2011 | Robinson | |
| 2011/0172902 A1 | 7/2011 | McBride et al. | |
| 2011/0184282 A1 | 7/2011 | Tockman | |
| 2011/0184828 A1* | 7/2011 | Siegel ............... | G06F 17/30038 705/26.1 |
| 2011/0185300 A1 | 7/2011 | Hinckley et al. | |
| 2011/0307783 A1 | 12/2011 | Robert et al. | |
| 2012/0159351 A1* | 6/2012 | Bell ......................... | G06F 3/01 715/753 |
| 2013/0024785 A1 | 1/2013 | Van Wie | |
| 2013/0036356 A1 | 2/2013 | Worrill et al. | |
| 2013/0086487 A1 | 4/2013 | Findlay et al. | |
| 2013/0205189 A1* | 8/2013 | DiPierro ............... | G06F 17/243 715/224 |
| 2013/0257777 A1 | 10/2013 | Benko et al. | |
| 2013/0290863 A1 | 10/2013 | Chen et al. | |
| 2014/0019883 A1 | 1/2014 | Tandon et al. | |
| 2014/0026076 A1 | 1/2014 | Jacob et al. | |
| 2014/0047330 A1 | 2/2014 | Yan | |
| 2014/0055399 A1* | 2/2014 | Lee ........................... | G06F 3/03 345/173 |
| 2014/0136985 A1 | 5/2014 | Albir et al. | |
| 2014/0143672 A1 | 5/2014 | Kim et al. | |
| 2014/0168096 A1* | 6/2014 | Bathiche ............... | G06F 3/0412 345/173 |
| 2014/0191983 A1 | 7/2014 | Choi et al. | |
| 2014/0258901 A1* | 9/2014 | Cho .................... | G06F 3/04883 715/765 |
| 2014/0267062 A1 | 9/2014 | Nakao | |
| 2014/0267081 A1 | 9/2014 | Kreek et al. | |
| 2014/0282103 A1 | 9/2014 | Crandall | |
| 2014/0328505 A1 | 11/2014 | Heinemann et al. | |
| 2015/0009154 A1 | 1/2015 | Shih et al. | |
| 2015/0032686 A1 | 1/2015 | Kuchoor | |
| 2015/0052200 A1 | 2/2015 | Ouyang et al. | |
| 2015/0052430 A1 | 2/2015 | Dwan | |
| 2015/0067483 A1* | 3/2015 | Demiya ................ | G06F 17/211 715/249 |
| 2015/0100876 A1* | 4/2015 | Neugebauer .......... | G06F 17/241 715/233 |
| 2015/0127681 A1 | 5/2015 | Lee et al. | |
| 2015/0177954 A1 | 6/2015 | Wei et al. | |
| 2015/0261378 A1 | 9/2015 | Lee et al. | |
| 2015/0286810 A1 | 10/2015 | Lebert | |
| 2015/0288633 A1 | 10/2015 | Ogundokun et al. | |
| 2015/0304376 A1 | 10/2015 | Gottlieb | |
| 2015/0319197 A1 | 11/2015 | Capt et al. | |
| 2015/0338939 A1 | 11/2015 | Vong | |
| 2015/0338940 A1 | 11/2015 | Vong | |
| 2015/0339050 A1 | 11/2015 | Vong | |
| 2015/0341400 A1 | 11/2015 | Vong | |
| 2016/0139878 A1 | 5/2016 | Van Wie | |

OTHER PUBLICATIONS

Bartram,"Off the Desktop: Pen and Touch Advanced HCI", Available at: <http://www.sfu.ca/siatclass/IAT351/Fall2012/Lectures/IAT351-Week11-Lecture1.pdf>, Nov. 14, 2012, 91 pages.

Everitt,"Two Worlds Apart: Bridging the Gap Between Physical and Virtual Media for Distributed Design Collaboration", In Proceedings: Conference on Human Factors in Computing Systems, vol. 5, Issue 1, Apr. 5, 2003, 8 pages.

(56) References Cited

OTHER PUBLICATIONS

Meghana-rao, "Mixing Stylus and Touch Input on Windows* 8", Retrieved From: <https://software.intel.com/en-us/articles/mixing-stylus-and-touch-input-on-windows-8#capture> Aug. 1, 2014, Sep. 6, 2013, 7 Pages.

Zack, "Microsoft's Office Touch UI and Pen UX Concepts Revealed (Updated)", Retrieved From: <http://www.microsoftproductreviews.com/apps-games/microsofts-office-touch-ui-pen-ux-concepts-revealed/>, May 17, 2014, 35 Pages.

"Adobe Illustrator Help and Tutuorials", Adobe, Jan. 2014, 545 pages.

"Non-Final Office Action", U.S. Appl. No. 14/665,330, dated Sep. 12, 2016, 12 pages.

"Non-Final Office Action", U.S. Appl. No. 14/665,413, dated Oct. 21, 2016, 10 pages.

"Non-Final Office Action", U.S. Appl. No. 14/665,462, dated Sep. 20, 2016, 10 pages.

"Final Office Action", U.S. Appl. No. 14/665,413, dated May 3, 2017, 10 pages.

"Final Office Action", U.S. Appl. No. 14/665,330, dated May 3, 2017, 12 pages.

"Final Office Action", U.S. Appl. No. 14/665,462, dated Apr. 20, 2017, 11 pages.

"Non-Final Office Action", U.S. Appl. No. 14/665,369, dated Jan. 31, 2017, 16 pages.

"Non-Final Office Action Issued in U.S. Appl. No. 14/665,330", dated Oct. 26, 2017, 12 Pages.

"Final Office Action Issued in U.S. Appl. No. 14/665,369", dated Oct. 20, 2017, 18 Pages.

"Non-Final Office Action Issued in U.S. Appl. No. 14/665,413", dated Nov. 30, 2017, 11 Pages.

"Non-Final Office Action Issued in U.S. Appl. No. 14/665,462", dated Sep. 25, 2017, 12 Pages.

"Final Office Action", U.S. Appl. No. 14/665,462, dated Apr. 5, 2018, 12 pages.

\* cited by examiner

Although Charles Kenneth Scott Moncrieff's translation of *À la recherche du temps perdu* is considered by many journalists and writers to be the best translation of any foreign work into the English language, his choice of *Remembrance of Things Past* as the general title alarmed the seriously ill Proust and misled generations of readers as to the novelist's true intent. It wasn't until 1992 that the title was finally changed to *In Search of Lost Time*. "Remembrance of Things Past" is a beautiful line from William Shakespeare's sonnet 30, but it conveys the opposite of Proust's own. When Scott Moncrieff chose this title, he did not know, of course, where Proust was going with the story and did not correctly interpret the Although Charles Kenneth Scott Moncrieff's translation of *À la recherche du temps perdu* is considered by many journalists and writers to be the best translation of any foreign work into the English language, his choice of *Remembrance of Things Past* as the general title alarmed the seriously ill Proust and misled generations of readers as to the novelist's true intent. Remembrance of Things Past" is a beautiful line from William Shakespeare's sonnet 30, but it conveys an idea that is really the opposite of Proust's own. When Scott Moncrieff chose this title, he did not know, of course, where Proust was going with the story and did not correctly interpret the title, which might indeed be taken to indicate a rather passive attempt by an elderly person to recollect days gone by.

Proust's theory of memory rejects the notion that we can simply sit and quietly resurrect the past in its true vividness through

*Increase font size 1 pt.*

*Mention title change then source*

Fig. 17

INK MODES

RELATED APPLICATION

This application claims priority under 35 U.S.C. § 119(e) to U.S. Provisional Patent Application No. 62/002,648, filed May 23, 2014 and titled "Ink," the entire disclosure of which is incorporated by reference in its entirety.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for ink modes are described. According to various embodiments, different ink modes are supported, such as a permanent ink mode, a transient ink mode, and so forth. For instance, embodiments support a permanent ink mode where ink applied to a document becomes part of primary content of the document. A transient ink mode is also supported in which ink applied to a document is processed according to transient ink mode behaviors. For instance, transient ink does not become part of primary content of a document, but is linked to primary content of the document.

According to various embodiments, ink versioning is supported. Generally, ink versioning enables different versions of a document and accompanying ink annotations to be captured that represent different snapshots of the document and its annotations over time.

Other ink modes are also supported, such as a shape recognition mode, a text recognition mode, a selection mode, a command mode, an ink note mode, an ink for emphasis mode, and so forth.

According to various implementations, a visual affordance of a particular active ink mode is presented on a document with which a user is interacting. For instance, the visual affordance is presented in response to detecting a proximity of a pen to an input surface such as a touch display. Further, different ink modes each are associated with different respective visual affordances.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 17 depicts an example implementation scenario for presenting a current version of a document along with an annotation layer in accordance with one or more embodiments.

DETAILED DESCRIPTION

Overview

Figure 1:
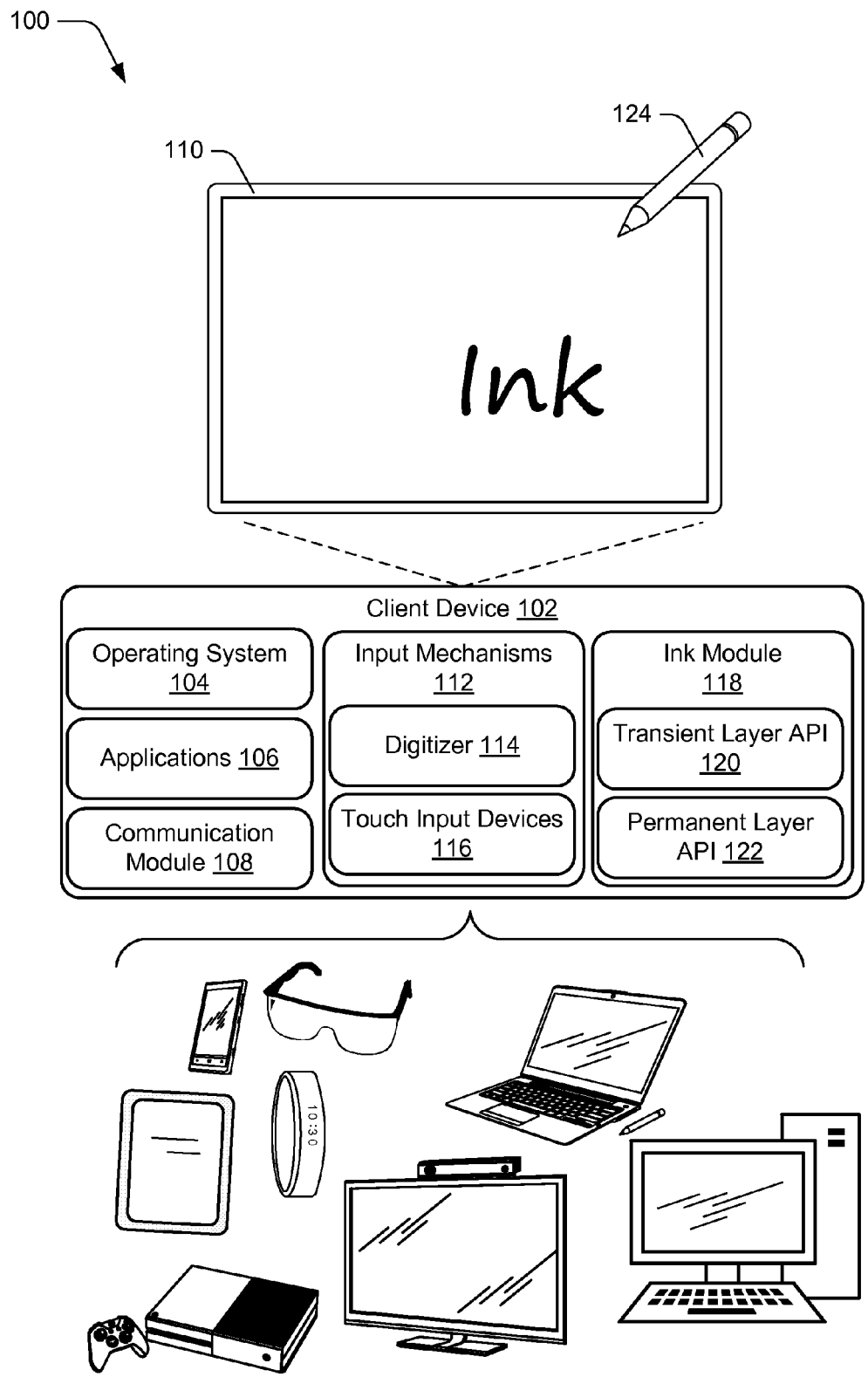
FIG. 1 is an illustration of an environment in an example implementation that is operable to employ techniques discussed herein in accordance with one or more embodiments.

Techniques for ink modes are described. Generally, ink refers to freehand input to a touch-sensing functionality such as a touchscreen, which is interpreted as digital ink, referred to herein as "ink." Ink may be provided in various ways, such as using a pen (e.g., an active pen, a passive pen, and so forth), a stylus, a finger, and so forth.

According to various implementations, different ink modes are supported. For instance, implementations support a permanent ink mode where ink applied to a document becomes part of primary content of the document. Permanent ink, for example, can be used to generate primary content, such as text content, graphics, and so forth.

A transient ink mode is also supported in which ink applied to a document is processed according to transient ink mode behaviors. For instance, transient ink does not become part of primary content of a document, but is linked to primary content of the document. Transient ink, for instance, can be used for annotation, for proofreading, for emphasis, and so forth. According to various implementations, transient ink is propagated to a transient ink layer that is separate from a primary content layer of a document, and can be accessed concurrently and/or separately from the primary content layer.

Transient ink thus enables a user to annotate a document and other content, and enables annotations to be persisted in a transient ink layer separate from the document such that primary content of the document is not cluttered with annotations. Further, a user may retrieve the transient ink layer to view annotations, such as for proofreading and editing primary content of the document.

According to various implementations, ink versioning is supported. Generally, ink versioning relates to the ability to discern an ink annotation as it relates to a document which it annotates, such as an ink annotation provides in a transient ink mode. If a document changes (e.g., in length, size, content, and so on), techniques for ink versioning seek to maintain a correlation between an ink annotation and a portion of a document to which the annotation relates. Accordingly, ink versioning enables different versions of a document and accompanying ink annotations to be captured that represent different snapshots of the document and its annotations over time. The versions can be separately accessed to provide an indication of how a document and its accompanying annotations change over time Ink versioning thus enables a context between ink annotations and primary content of a document to be maintained.

Other ink modes are also supported, such as a shape recognition mode, a text recognition mode, a selection mode, a command mode, an ink note mode, an ink for emphasis mode, and so forth. Attributes of these different ink modes are detailed below.

According to various implementations, a visual affordance of a particular active ink mode is presented on a document with which a user is interacting. For instance, the visual affordance is presented in response to detecting a proximity of a pen to an input surface such as a touch display. Further, different ink modes each are associated with different respective visual affordances. Thus, a user is informed of which ink mode is currently active without having to access a settings menu or other interface separate from a document with which the user is interacting, thus reducing user interactions required to ascertain an active ink mode.

In the following discussion, an example environment is first described that is operable to employ techniques described herein. Next, a section entitled "Example Implementation Scenarios and Procedures" describes some example implementation scenarios and methods for ink modes in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for ink modes discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 25.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represents functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communication over wired and/or wireless connections. For instance, the communication module 108 represents hardware and logic for communication via a variety of different wired and/or wireless technologies and protocols.

The client device 102 further includes a display device 110, input mechanisms 112 including a digitizer 114 and touch input devices 116, and an ink module 118. The display device 110 generally represents functionality for visual output for the client device 102. Additionally, the display device 110 represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the displays 110; integral examples include gesture-sensitive displays with integrated touch-sensitive or motion-sensitive sensors. The digitizer 114 represents functionality for converting various types of input to the display device 110 and the touch input devices 116 into digital data that can be used by the computing device 102 in various ways, such as for generating digital ink.

According to various implementations, the ink module 118 represents functionality for performing various aspects of techniques for ink modes discussed herein. Various functionalities of the ink module 118 are discussed below. The ink module 118 includes a transient layer application programming interface (API) 120 and a permanent layer API 122. The transient layer API 120 represents functionality for enabling interaction with a transient ink layer, and the permanent layer API 122 represents functionality for enabling ink interaction with a permanent object (e.g., document) layer. In at least some implementations, the transient layer API 120 and the permanent layer API 122 may be utilized (e.g., by the applications 106) to access transient ink functionality and permanent ink functionality, respectively.

The environment 100 further includes a pen 124, which is representative of an input device for providing input to the display device 110. Generally, the pen 124 is in a form factor of a traditional pen but includes functionality for interacting with the display device 110 and other functionality of the client device 102. In at least some implementations, the pen 124 is an active pen that includes electronic components for interacting with the client device 102. The pen 124, for instance, includes a battery that can provide power to internal components of the pen 124. Alternatively or additionally, the pen 124 may include a magnet or other functionality that supports hover detection over the display device 110. This is not intended to be limiting, however, and in at least some implementations the pen 124 may be passive, e.g., a stylus without internal electronics. Generally, the pen 124 is representative of an input device that can provide input that can be differentiated from other types of input by the client device 102. For instance, the digitizer 114 is configured to differentiate between input provided via the pen 124, and input provided by a different input mechanism such as a user's finger, a stylus, and so forth.

Having described an example environment in which the techniques described herein may operate, consider now a discussion of an example implementation scenario in accordance with one or more embodiments.

Transient Ink and Permanent Ink

According to various implementations, ink can be applied in different ink modes including a transient ink mode and a permanent ink mode. Generally, transient ink refers to ink that is temporary and that can be used for various purposes, such as invoking particular actions, annotating a document, and so forth. For instance, in transient implementations, ink can be used for annotation layers for electronic documents, temporary visual emphasis, text recognition, invoking various commands and functionalities, and so forth.

Permanent ink generally refers to implementations where ink becomes a part of the underlying object, such as for creating a document, writing on a document (e.g., for annotation and/or editing), applying ink to graphics, and so forth. Permanent ink, for example, can be considered as a graphics object, such as for note taking, for creating visual content, and so forth.

In at least some implementations, a pen (e.g., the pen 124) applies ink whenever the pen is in contact with an input surface, such as the display device 104 and/or other input surface. Further, a pen can apply ink across many different applications, platforms, and services. In one or more implementations, an application and/or service can specify how ink is used in relation to an underlying object, such as a word processing document, a spreadsheet and so forth. For instance, in some scenarios ink is applied as transient ink, and other scenarios ink is applied as permanent ink. Examples of different implementations and attributes of transient ink and permanent ink are detailed below.

Example Implementation Scenarios and Procedures

This section describes some example implementation scenarios and example procedures for ink modes in accordance with one or more implementations. The implementation scenarios and procedures may be implemented in the environment 100 described above, the system 2500 of FIG. 25, and/or any other suitable environment. The implementation scenarios and procedures, for example, describe example operations of the client device 102. While the implementation scenarios and procedures are discussed with reference to a particular application, it is to be appreciated that techniques for ink modes discussed herein are applicable across a variety of different applications, services, and environments. In at least some embodiments, steps described for the various procedures are implemented automatically and independent of user interaction.

Figure 2:
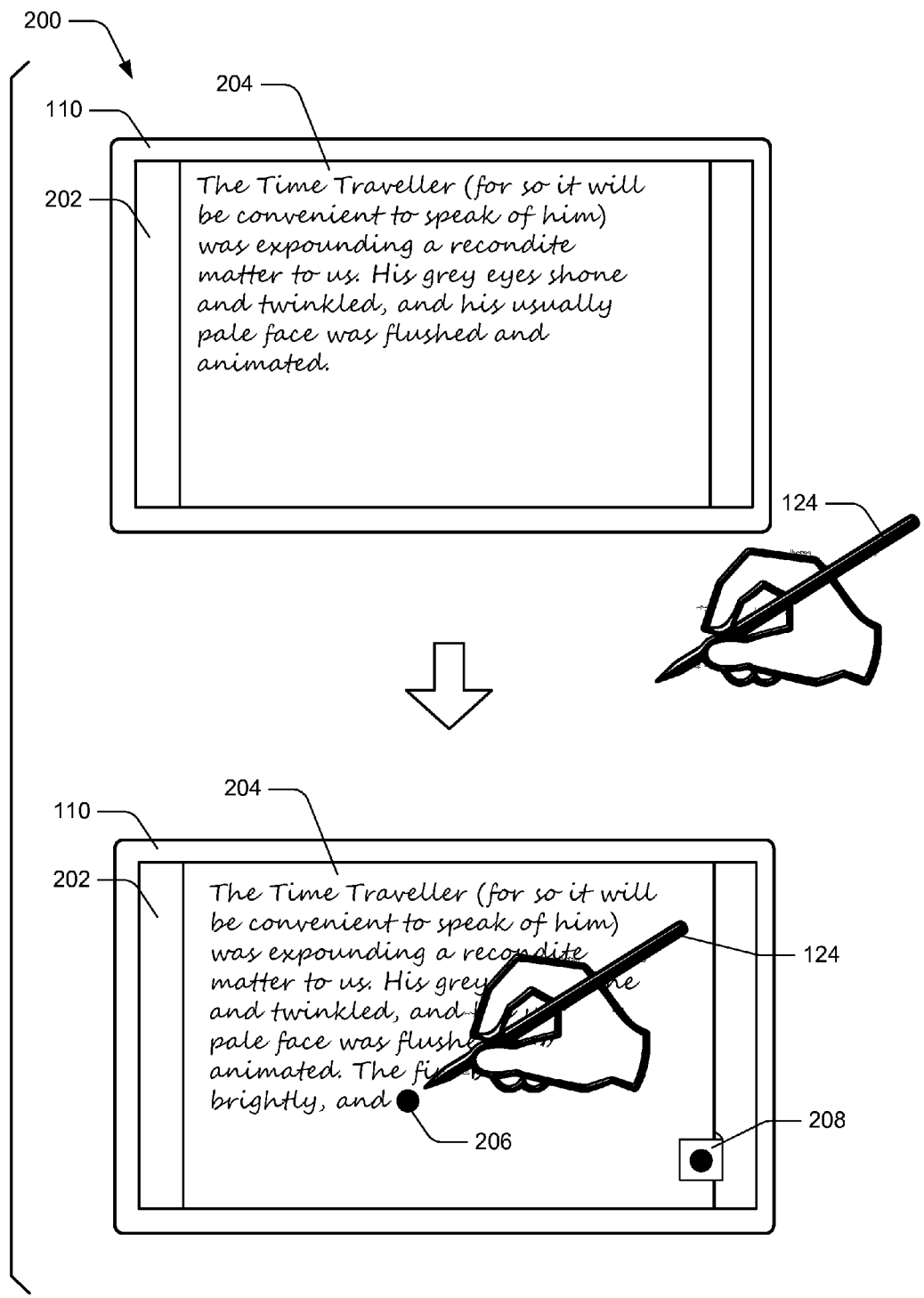
FIG. 2 depicts an example implementation scenario for a permanent ink mode in accordance with one or more embodiments.

FIG. 2 depicts an example implementation scenario 200 for a permanent ink mode in accordance with one or more implementations. The upper portion of the scenario 200 includes a graphical user interface (GUI) 202 displayed on the display 110. Generally, the GUI 202 represents a GUI for a particular functionality, such as an instance of the applications 106. Also depicted is a user holding the pen 124. Displayed within the GUI 202 is a document 204, e.g., an electronic document generated via one of the applications 106.

Proceeding to the lower portion of the scenario 200, the user brings the pen 124 in proximity to the surface of the display 110 and within the GUI 202. The pen 124, for instance, is placed within a particular distance of the display 110 (e.g., less than 2 centimeters) but not in contact with the display 110. This behavior is generally referred to herein as "hovering" the pen 124. In response to detecting proximity of the pen 124, a hover target 206 is displayed within the GUI 202 and at a point within the GUI 202 that is directly beneath the tip of the pen 124. Generally, the hover target 206 represents a visual affordance that indicates that ink functionality is active such that a user may apply ink to the document 204.

According to various implementations, the visual appearance (e.g., shape, color, shading, and so forth) of the hover target 206 provides a visual cue indicating a current ink mode that is active. In the scenario 200, the hover target is presented as a solid circle, which indicates that a permanent ink mode is active. For instance, if the user proceeds to put the pen 124 in contact with the display 110 to apply ink to the document 204 in a permanent ink mode, the ink will become part of the document 204, e.g., will be added to a primary content layer of the document 204. Consider, for example, that the text (e.g., primary content) displayed in the document 204 was created via ink input in a permanent ink mode. Thus, ink applied in a permanent ink mode represents a permanent ink layer that is added to a primary content layer of the document 204.

In further response to detecting hovering of the pen 124, an ink flag 208 is visually presented adjacent to and/or at least partially overlaying a portion of the document 204. Generally, the ink flag 208 represents a visual affordance that indicates that ink functionality is active such that a user may apply ink to the document 204. In at least some implementations, the ink flag 208 may be presented additionally or alternatively to the hover target 206. In this particular example, the ink flag 208 includes a visual cue indicating a current ink mode that is active. In the scenario 200, the ink flag 208 includes a solid circle, which indicates that a permanent ink mode is active. As further detailed below, the ink flag 208 is selectable to cause an ink menu to be displayed that includes various ink-related functionalities, options, and settings that can be applied.

Figure 3:
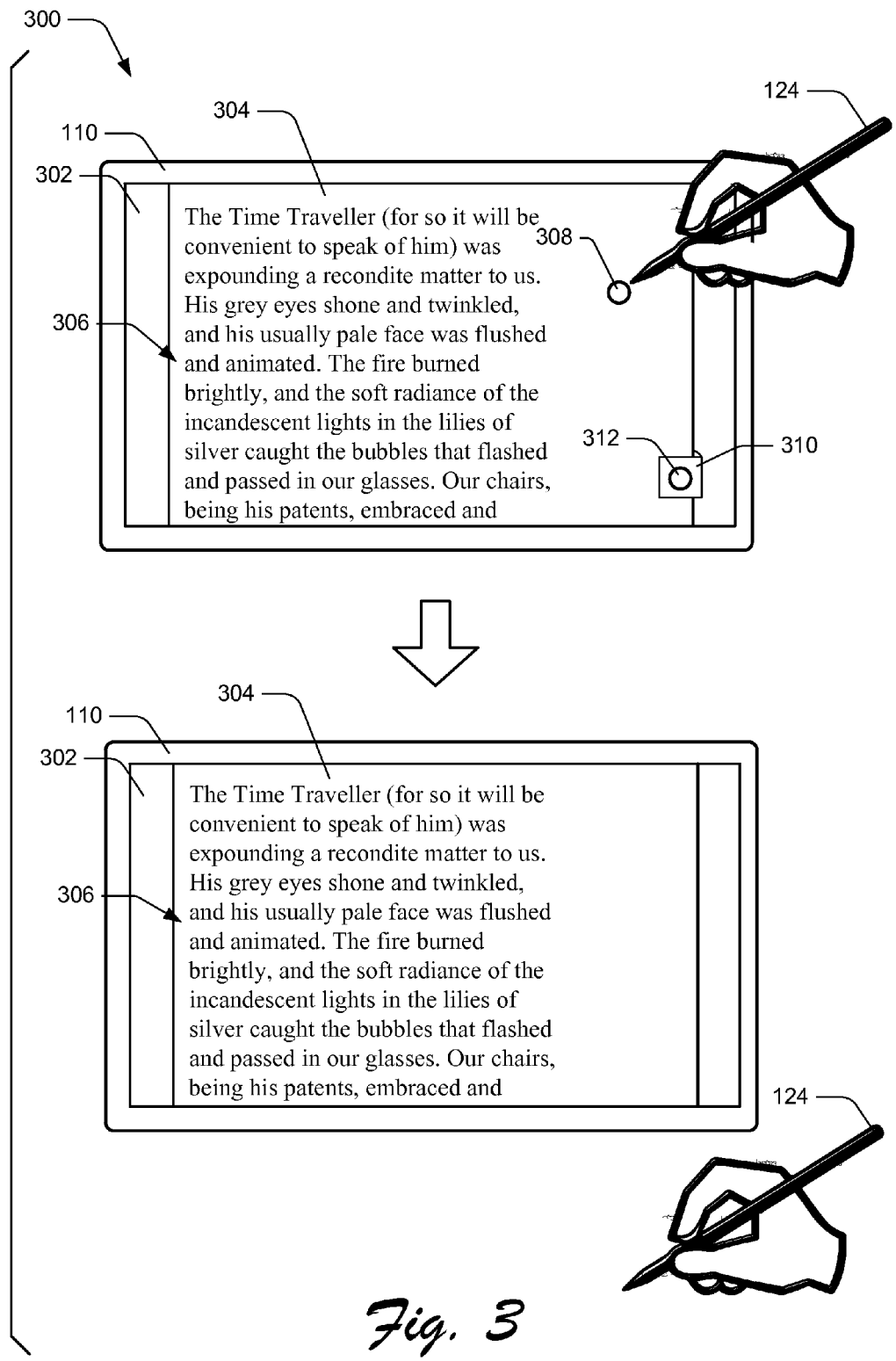
FIG. 3 depicts an example implementation scenario for a transient ink mode in accordance with one or more embodiments.

FIG. 3 depicts an example implementation scenario 300 for a transient ink mode in accordance with one or more implementations. The upper portion of the scenario 300 includes a graphical user interface (GUI) 302 displayed on the display 110. Generally, the GUI 302 represents a GUI for a particular functionality, such as an instance of the applications 106. Displayed within the GUI 302 is a document 304, e.g., an electronic document generating via one of the applications 106. The document 304 includes primary content 306, which represents content generated as part of a primary content layer for the document 304. For instance, in this particular example the document 304 is a text-based document, and thus the primary content 306 includes text that is populated to the document. Various other types of documents and primary content may be employed, such as for graphics, multimedia, web content, and so forth.

As further illustrated, a user is hovering the pen 124 within a certain proximity of the surface of the display 110, such as discussed above with reference to the scenario 200. In response, a hover target 308 is displayed within the document 304 and beneath the tip of the pen. In this particular example, the hover target 308 is presented as a hollow circle, thus indicating that a transient ink mode is active. For instance, if the user proceeds to apply ink to the document 304, the ink will behave according to a transient ink mode. Examples of different transient ink behaviors are detailed elsewhere herein.

Further in response to the user hovering the pen 124 over the display 110, an ink flag 310 is presented. In this particular example, the ink flag 310 includes a hollow circle 312, thus providing a visual cue that a transient ink mode is active.

Proceeding to the lower portion of the scenario 300, the user removes the pen 124 from proximity to the display 110. In response, the hover target 308 and the ink flag 310 are removed from the display 110. For instance, in at least some implementations, a hover target and/or an ink flag are presented when the pen 124 is detected as being hovered over the display 110, and are removed from the display 110 when the pen 124 is removed such that the pen 124 is no longer detected as being hovered over the display 110. This is not intended to be limiting, however, and in at least some implementations, an ink flag may be persistently displayed to indicate that inking functionality is active and/or available.

Figure 4:
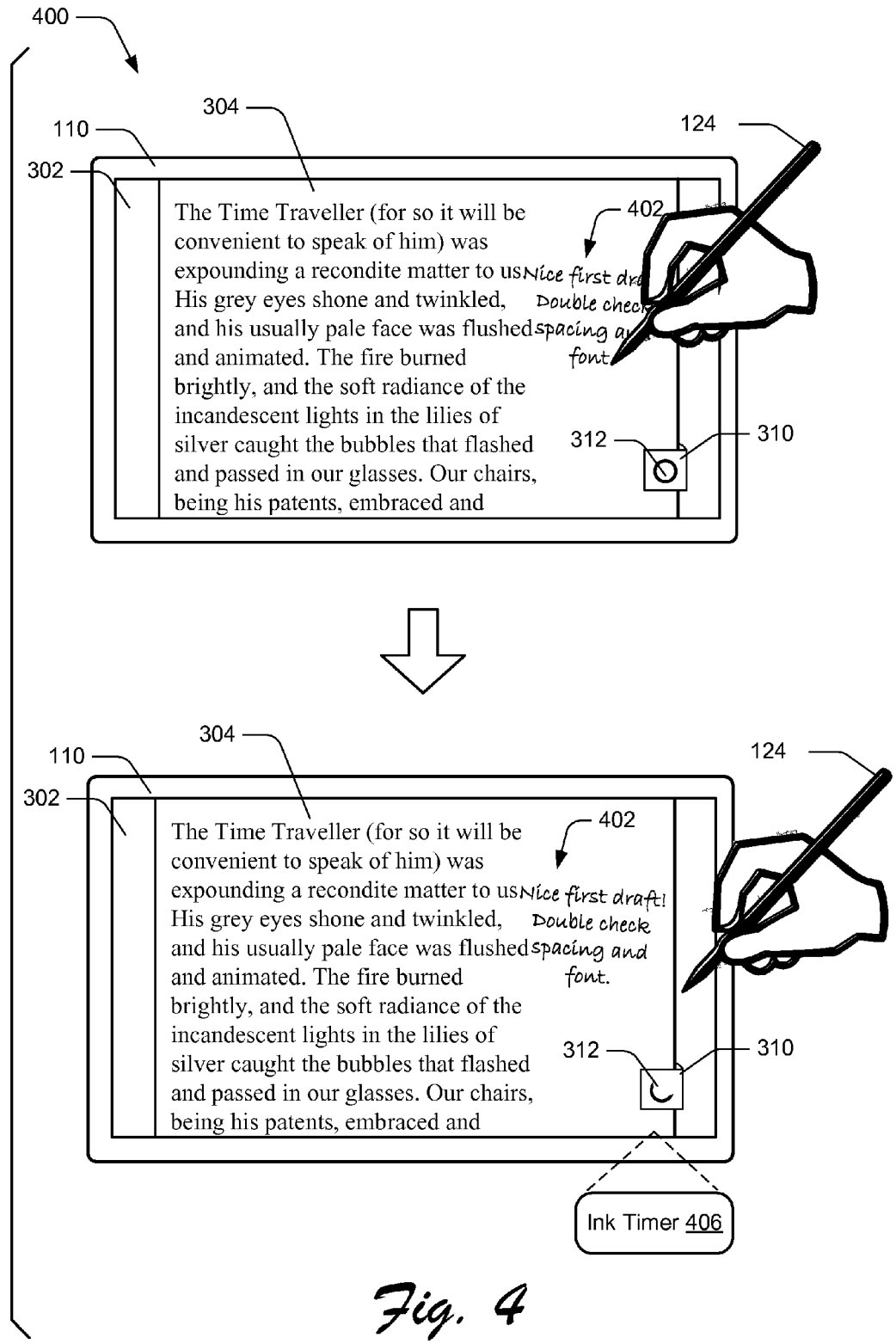
FIG. 4 depicts an example implementation scenario for a transient ink mode in accordance with one or more embodiments.

FIG. 4 depicts an example implementation scenario 400 for a transient ink mode in accordance with one or more implementations. The upper portion of the scenario 300 includes the GUI 302 with the document 304 (introduced above) displayed on the display 110. In at least some implementations, the scenario 400 represents an extension of the scenario 300, above.

In the upper portion of the scenario 400, a user applies ink content 402 to the document 304 using the pen 124. In this particular scenario, the ink content 402 corresponds to an annotation of the document 402. It is to be appreciated, however, that a variety of different types of transient ink other than annotations may be employed. Notice that as the user is applying the ink content 402, a hover target is not displayed. For instance, in at least some implementations when the pen 124 transitions from a hover position to contact with the display 110, a hover target is removed. Notice also that the ink flag 310 includes a hollow circle 312, indicating that the ink content 402 is applied according to a transient ink mode.

Proceeding to the lower portion of the scenario 400, the user lifts the pen 124 from the display 110 such that the pen 124 is not detected, e.g., the pen 124 is not in contact with the display 110 and is not in close enough proximity to the display 110 to be detected as hovering. In response to the pen 124 no longer being detected in contact with or in proximity to the display 110, an ink timer 406 begins running For instance, the ink timer 406 begins counting down from a specific time value, such as 30 seconds, 60 seconds, and so forth. Generally, the ink timer is representative of functionality to implement a countdown function, such as for tracking time between user interactions with the display 110 via the pen 124. The ink timer 406, for example, represents a functionality of the ink module 118.

As a visual cue that the ink counter 406 is elapsing, the hollow circle 312 begins to unwind, e.g., begins to disappear from the ink flag 310. In at least some implementations, the hollow circle 312 unwinds at a rate that corresponds to the countdown of the ink timer 406. For instance, when the ink timer 406 is elapsed by 50%, then 50% of the hollow circle 312 is removed from the ink flag 310. Thus, unwinding of the hollow circle 312 provides a visual cue that the ink timer 406 is elapsing, and how much of the ink timer has elapsed and/or remains to be elapsed.

In at least some implementations, if the ink timer 406 is elapsing as in the lower portion of the scenario 400 and the user proceeds to place the pen 124 in proximity to the display 110 (e.g., hovered or in contact with the display 110), the ink timer 406 will reset and will not begin elapsing again until the user removes the pen 124 from the display 110 such that the pen 124 is not detected. In such implementations, the hollow circle 312 will be restored within the ink flag 310 as in the upper portion of the scenario 400.

Figure 5:
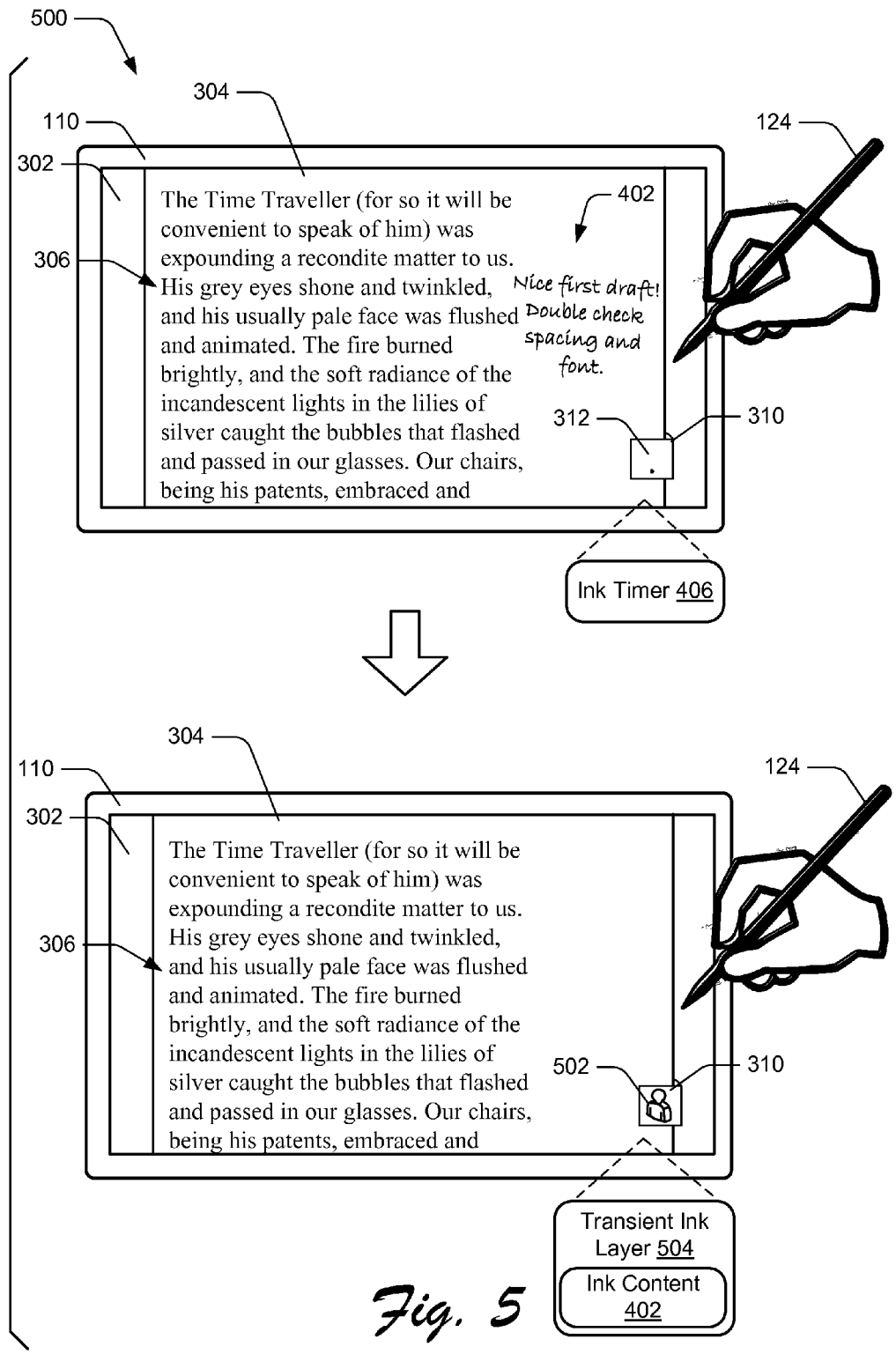
FIG. 5 depicts an example implementation scenario for a transient ink mode in accordance with one or more embodiments.

FIG. 5 depicts an example implementation scenario 500 for a transient ink mode in accordance with one or more implementations. The upper portion of the scenario 300 includes the GUI 302 with the document 304 (introduced above) displayed on the display 110. In at least some implementations, the scenario 500 represents an extension of the scenario 400, above.

In the upper portion of the scenario 500, the ink timer 406 has elapsed. For instance, notice that the hollow circle 312 has completely unwound within the ink flag 310, e.g., is visually removed from the ink flag 310. According to various implementations, this provides a visual cue that the ink timer 406 has completely elapsed.

Proceeding to the lower portion of the scenario 500, and in response to expiry of the ink timer 406, the ink content 402 is removed from the GUI 302 and saved as part of a transient ink layer 504 for the document 304. Further, the ink flag 310 is populated with a user icon 502. The user icon 502, for example, represents a user that is currently logged in to the computing device 102, and/or a user that is interacting with the document 304. Alternatively or additionally, the pen 124 includes user identification data that is detected by the computing device 102 and thus is leveraged to track which user is interacting with the document 304. For example, the pen 124 includes a tagging mechanism (e.g., a radio-frequency identifier (RFID) chip) embedded with a user identity for a particular user. Thus, when the pen 124 is placed in proximity to the display 110, the tagging mechanism is detected by the computing device 102 and utilized to attribute ink input and/or other types of input to a particular user. As used herein, the term "user" may be used to refer to an identity for an individual person, and/or an identity for a discrete group of users that are grouped under a single user identity.

According to various implementations, population of the user icon 502 to the ink flag 310 represents a visual indication that the transient ink layer 504 exists for the document 304, and that the transient ink layer 504 is associated with (e.g., was generated by) a particular user. Generally, the transient ink layer 504 represents a data layer that is not part of the primary content layer of the document 304, but that is persisted and can be referenced for various purposes. Further attributes of transient ink layers are described elsewhere herein.

Figure 6:
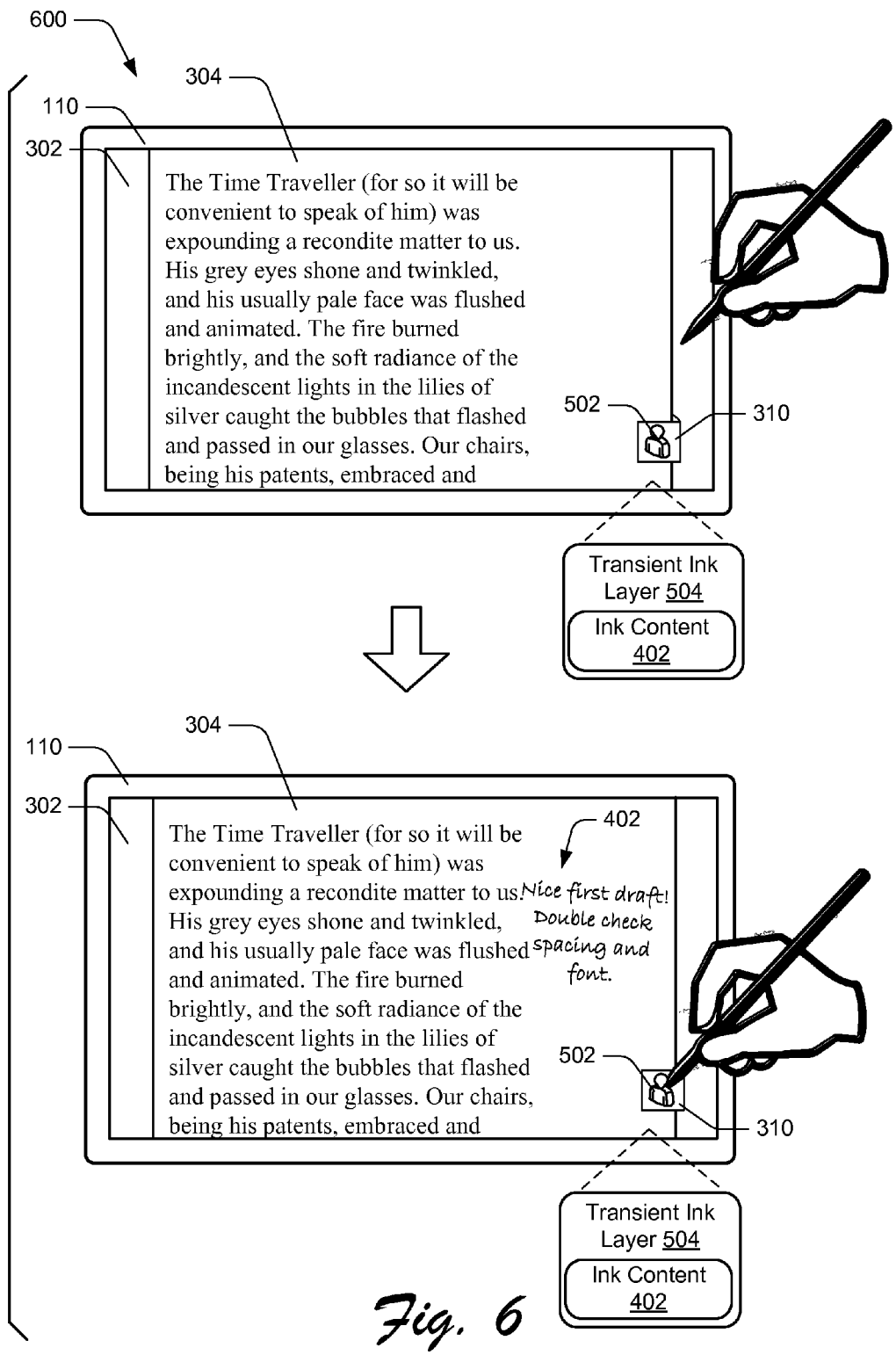
FIG. 6 depicts an example implementation scenario for a transient ink mode in accordance with one or more embodiments.

FIG. 6 depicts an example implementation scenario 600 for a transient ink mode in accordance with one or more implementations. The upper portion of the scenario 600 includes the GUI 302 with the document 304 (introduced above) displayed on the display 110. In at least some implementations, the scenario 600 represents an extension of the scenario 500, above.

In the upper portion of the scenario 600, the ink flag 310 is displayed indicating that a transient ink layer (e.g., the transient ink layer 504) exists for the document 304, and that the transient ink layer is linked to a particular user represented by the user icon 502 in the ink flag 310.

Proceeding to the lower portion of the scenario 600, a user selects the ink flag 310 with the pen 124, which causes the ink content 402 to be returned to display as part of the document 304. The ink content 402, for example, is bound to the transient ink layer 504, along with other transient ink content generated for the transient ink layer 504. Thus, in at least some implementations, the transient ink layer 504 is accessible by various techniques, such as by selection of the ink flag 310.

Additionally or alternatively to selection of the ink flag 310, if the user proceeds to apply further ink content to the document 304 while in the transient ink mode, the transient ink layer 504 is retrieved and transient ink content included as part of the transient ink layer 504 is displayed as part of the document 504. In at least some implementations, transient ink content of the transient ink layer 504 is bound (e.g., anchored) to particular portions (e.g., pages, lines, text, and so forth) of the document 304. For instance, the user generated the ink content 402 adjacent to a particular section of text. Thus, when the transient ink layer 504 is recalled as depicted in the scenario 600, the ink content 402 is displayed adjacent to the particular section of text.

According to various implementations, the transient ink layer 504 is cumulative such that a user may add ink content to and remove ink content from the transient ink layer 504 over a span of time and during multiple different interactivity sessions. Thus, the transient ink layer 504 generally represents a record of multiple user interactions with the document 304, such as for annotations, proofreading, commenting, and so forth. Alternatively or additionally, multiple transient layers may be created for the document 304, such as when significant changes are made to the primary content 306, when other users apply transient ink to the document 304, and so forth.

In at least some implementations, when the user pauses interaction with the document 304, the ink timer 406 begins elapsing such as discussed above with reference to the scenarios 400, 500. Accordingly, the scenario 600 may return to the scenario 400.

Figure 7:
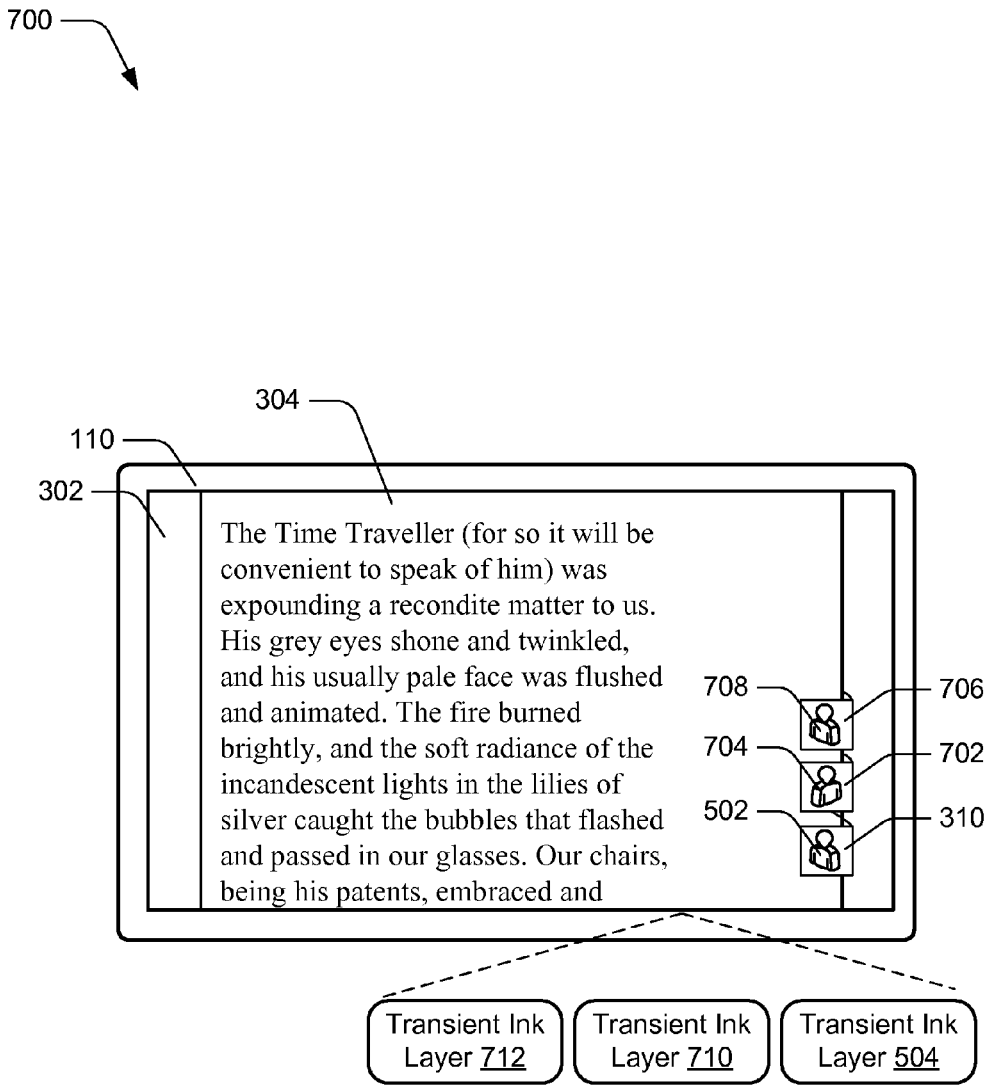
FIG. 7 depicts an example implementation scenario for a multiple transient ink layers in accordance with one or more embodiments.

FIG. 7 depicts an example implementation scenario 700 for a multiple transient ink layers in accordance with one or more implementations. The upper portion of the scenario 600 includes the GUI 302 with the document 304 (introduced above) displayed on the display 110. In at least some implementations, the scenario 700 represents an extension of the scenario 600, above.

Displayed as part of the GUI 302 is the ink flag 310 with the user icon 502, along with an ink flag 702 with a user icon 704, and an ink flag 706 with a user icon 708. Generally, the ink flags 702, 706 represent other users that have interacted with the document 304, and the user icons 704, 708 represent users associated with their respective ink flags. Thus, each individual ink flag represents a different respective user.

The scenario 700 further includes the transient ink layer 504 associated with the ink flag 310, along with a transient ink layer 710 linked to the ink flag 702, and a transient ink layer 712 linked to the ink flag 706. Generally, the transient ink layers 710, 712 represent individual transient ink layers that are bound to individual user identities. Each individual transient ink layer 504, 710, 712 is individually accessible can be viewed and edited separately. In at least some implementations, the multiple of the transient ink layers 504, 710, 712 can be invoked such that ink content for the multiple layers is displayed concurrently as part of the document 304. Example ways of invoking a transient ink layer are detailed elsewhere herein. Further, transient ink layer behaviors discussed elsewhere herein are applicable to the scenario 700.

Figure 8:
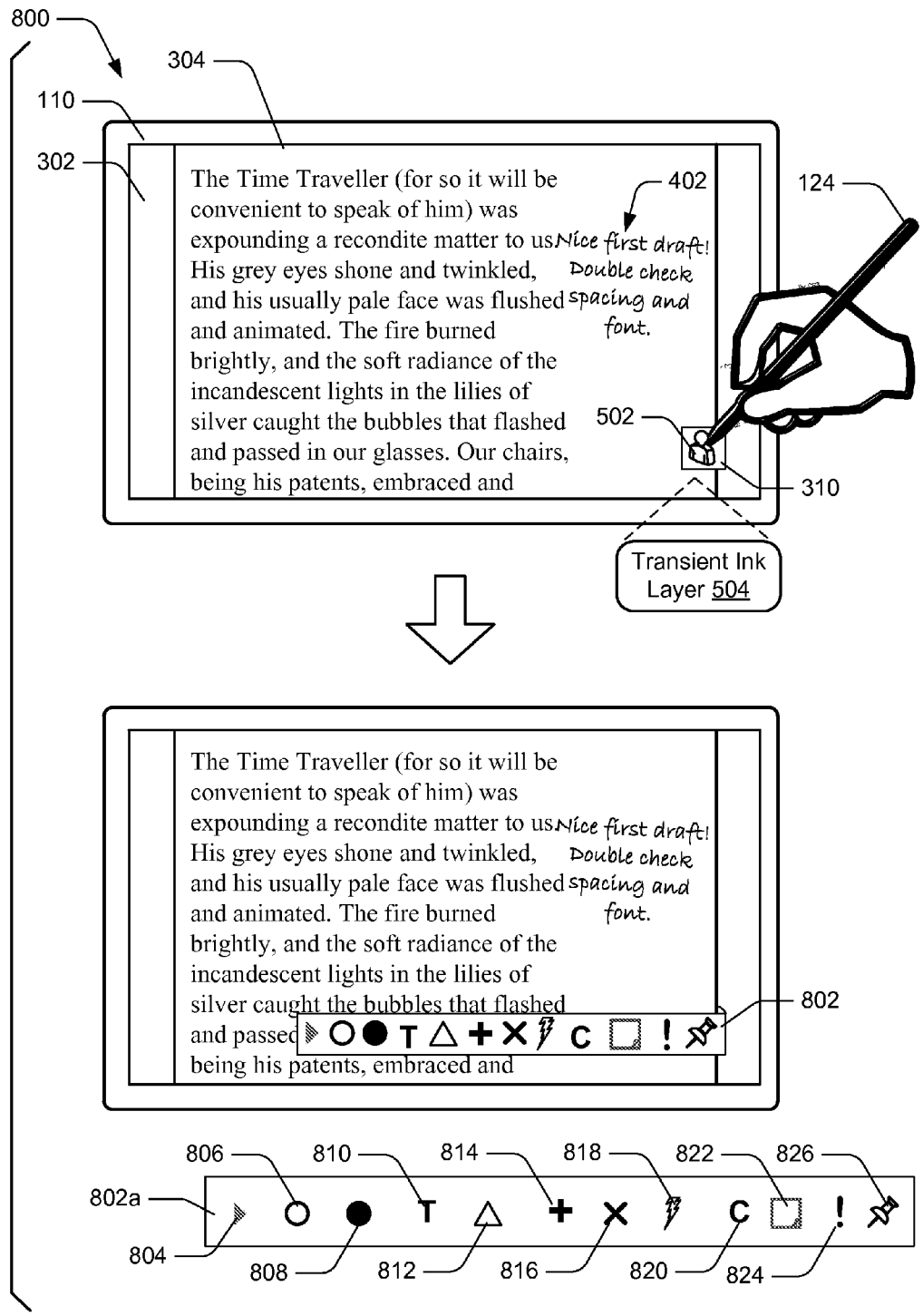
FIG. 8 depicts an example implementation scenario for presenting an inking menu in accordance with one or more embodiments.

FIG. 8 depicts an example implementation scenario 800 for presenting an inking menu in accordance with one or more implementations. The upper portion of the scenario 800 includes the GUI 302 with the document 304 (introduced above) displayed on the display 110. In at least some implementations, the scenario 800 represents an extension of the scenarios discussed above. Further to the scenario 800, the user selects the ink flag 310 while the transient layer 504 is active. For instance, the user manipulates the pen 124 to first tap the ink flag 310, which invokes the transient ink layer 504 such that the ink content 402 is retrieved and displayed, and then taps the ink flag 310 a second time within a particular period of time, e.g., 3 seconds.

Proceeding to the lower portion of the scenario 800 and in response to the second selection of the ink flag 310, the ink flag 310 expands to present an ink menu 802. Generally, the ink menu 802 includes multiple selectable indicia that are selectable to cause different ink-related actions to be performed, such as to apply and/or change various settings, invoke various functionalities, and so forth. To aid in visual understanding, an expanded representation 802a of the ink menu 802 is depicted. The example visual indicia included in the ink menu 802 are now discussed in turn.

Play control 804—according to various implementations, when ink content (e.g., transient and/or permanent ink) is applied to a document, application of the ink content is recorded in real-time. For instance, application of ink content is recorded as an animation that shows the ink content being applied to a document as it was initially applied by a user. Accordingly, selection of the play control 804 causes a playback of ink content as it was originally applied. Further details concerning ink playback are presented below.

Transient Ink Control 806—selection of this control causes a transition from a different ink mode (e.g., a permanent ink mode) to a transient ink mode.

Permanent Ink Control 808—selection of this control causes a transition from a different ink mode (e.g., a transient ink mode) to a permanent ink mode.

Text Recognition Control 810—selection of this control causes a transition to a text recognition mode. For instance, in a text recognition mode, characters applied using ink are converted into machine-encoded text.

Shape Recognition Control 812—selection of this control causes a transition to a shape recognition mode. For instance, in a shape recognition mode, shapes applied using ink are converted into machine-encoded shapes, such as quadrilaterals, triangles, circles, and so forth.

Selection Mode Control 814—selection of this control causes a transition to a selection mode. Generally, in a selection mode, input from a pen is interpreted as a selection action, such as to select text and/or other objects displayed in a document.

Erase Mode Control 816—selection of this control causes a transition to an erase mode. Generally, in an erase mode, input from a pen is interpreted as an erase action, such as to erase ink, text, and/or other objects displayed in a document.

Command Control 818—selection of this control causes a transition to a command mode. For instance, in a command mode, input from a pen is interpreted as a command to perform a particular action and/or task.

Color Control 820—selection of this control enables a user to change an ink color that is applied to a document. For example, selection of this control causes a color menu to be presented that includes multiple different selectable colors. Section of a color from the color menu specifies the color for ink content that is applied to a document.

Ink Note Control 822—this control is selectable to invoke ink note functionality, such as to enable ink content to be propagated to a note Ink note functionality is described in more detail below.

Emphasis Control 824—selection of this control causes a transition from a different ink mode (e.g., a permanent or transient ink mode) to an emphasis ink mode. Generally, in an emphasis ink mode, ink is temporary and fades and disappears after a period of time. Emphasis ink, for example, is not saved as part of primary content or a transient ink layer, but is used for temporary purposes, such as for visually identifying content, emphasizing content, and so forth.

Pin Control 826—this control is selectable to pin a transient ink layer to a document, and to unpin the transient ink layer from the document. For instance, selecting the pin control 826 causes transient ink of a transient ink layer to be persistently displayed as part of a document. With reference to the scenario 500, for example, selection of the pin control 826 prevents the ink timer 406 from being initiated when a user removes the pen 124 from proximity to the display 110.

The pin control 826 is also selectable to unpin a transient ink layer from a document. For instance, with reference to the scenario 500, selection of the pin control 826 unpins a transient ink layer such that the ink timer 406 begins to elapse when a user removes the pen 124 from proximity to the display 110. In at least some implementations, when the user selects the ink flag 310 to cause the ink menu 802 to be presented, the pin control 826 is presented within the ink menu 802 in the same region of the display in which the user icon 502 is displayed in the ink flag 310. Thus, a user can double-tap on the same spot in the over the ink flag 310 to cause the ink menu to be presented, and to pin and unpin transient ink from the document 304.

In at least some implementations, the visuals presented for the individual controls represent hover targets that are displayed when the respective modes are active. The example implementation scenarios above depict examples of hover targets for transient and permanent ink modes, and similar scenarios apply for other ink modes and the visuals displayed for their respective controls in the ink menu 802.

According to one or more implementations, providing input outside of the ink menu 802 causes the ink menu 802 to collapse. For instance, if the user taps the pen 124 in the GUI 302 outside of the ink menu 802, the ink menu 802 collapses such that the ink flag 310 is again displayed.

Figure 9:
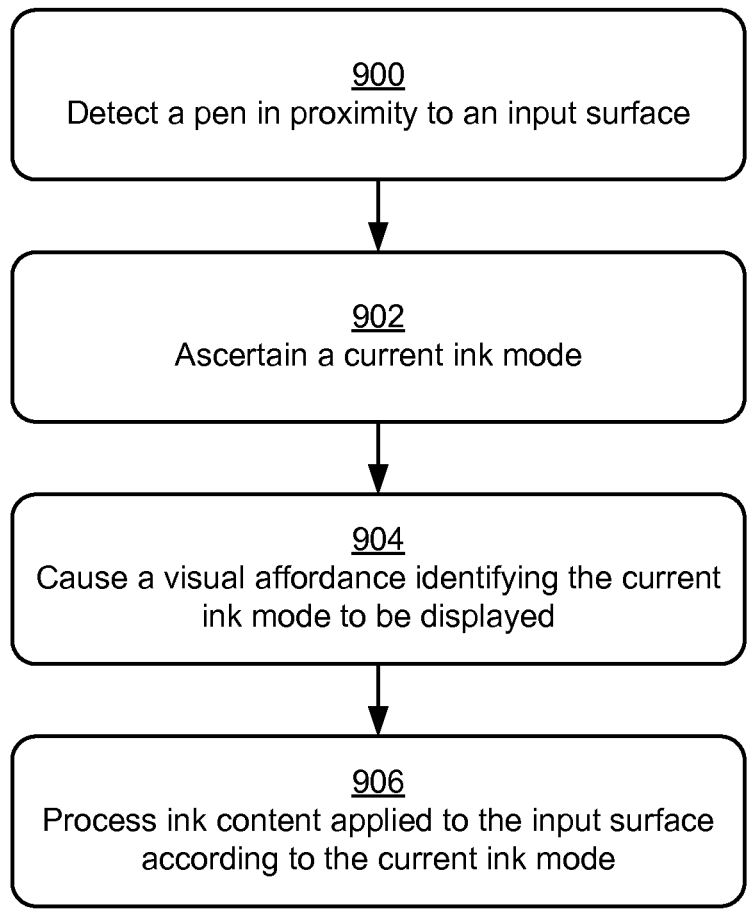
FIG. 9 is a flow diagram that describes steps in a method for processing ink according to a current ink mode in accordance with one or more embodiments.

FIG. 9 is a flow diagram that describes steps in a method in accordance with one or more embodiments. The method, for instance, describes an example procedure for processing ink according to a current ink mode in accordance with one or more embodiments.

Step 900 detects a pen in proximity to an input surface. The touch input device 116, for instance, detects that the pen 124 is hovered and/or in contact with the touch input device 116. As referenced above, a hover operation can be associated with a particular threshold proximity to an input surface such that hovering the pen 124 at or within the threshold proximity to the input surface is interpreted as a hover operation, but placing the pen 124 farther than the threshold proximity from the input surface is not interpreted as a hover operation.

Step 902 ascertains a current ink mode. The ink module 118, for example, ascertains an ink mode that is currently active on the computing device 102. Examples of different ink modes are detailed elsewhere herein, and include a permanent ink mode, a transient ink mode, a text recognition mode, a shape recognition mode, a selection mode, an erase mode, a command mode, and so forth.

In at least some implementations, a current ink mode may be automatically selected by the ink module 118, such as based on an application and/or document context that is currently in focus. For instance, an application 106 may specify a default ink mode that is to be active for the application. Further, some applications may specify ink mode permissions that indicate allowed and disallowed ink modes. A particular application 106, for example, may specify that a permanent ink mode is not allowed for documents presented by the application, such as to protect documents from being edited.

Alternatively or additionally, a current ink mode is user-selectable, such as in response to user input selecting an ink mode from the ink menu 802. For instance, a user may cause a switch from a default ink mode for an application to a different ink mode.

Step 904 causes a visual affordance identifying the current ink mode to be displayed. Examples of such an affordance include a hover target, a visual included as part of an ink flag and/or ink-related menu, and so forth. Examples of different visual affordances are detailed throughout this description and the accompanying drawings.

Step 906 processes ink content applied to the input surface according to the current ink mode. The ink content, for instance, is processed as permanent ink, transient ink, and so forth. For example, if a permanent ink mode is active, the ink content is saved as permanent ink, such as part of a primary content layer of a document. If the transient ink mode is active, the ink content is propagated to a transient ink layer of a document. Examples of different mode-specific ink behaviors and actions are detailed elsewhere herein.

Figure 10:
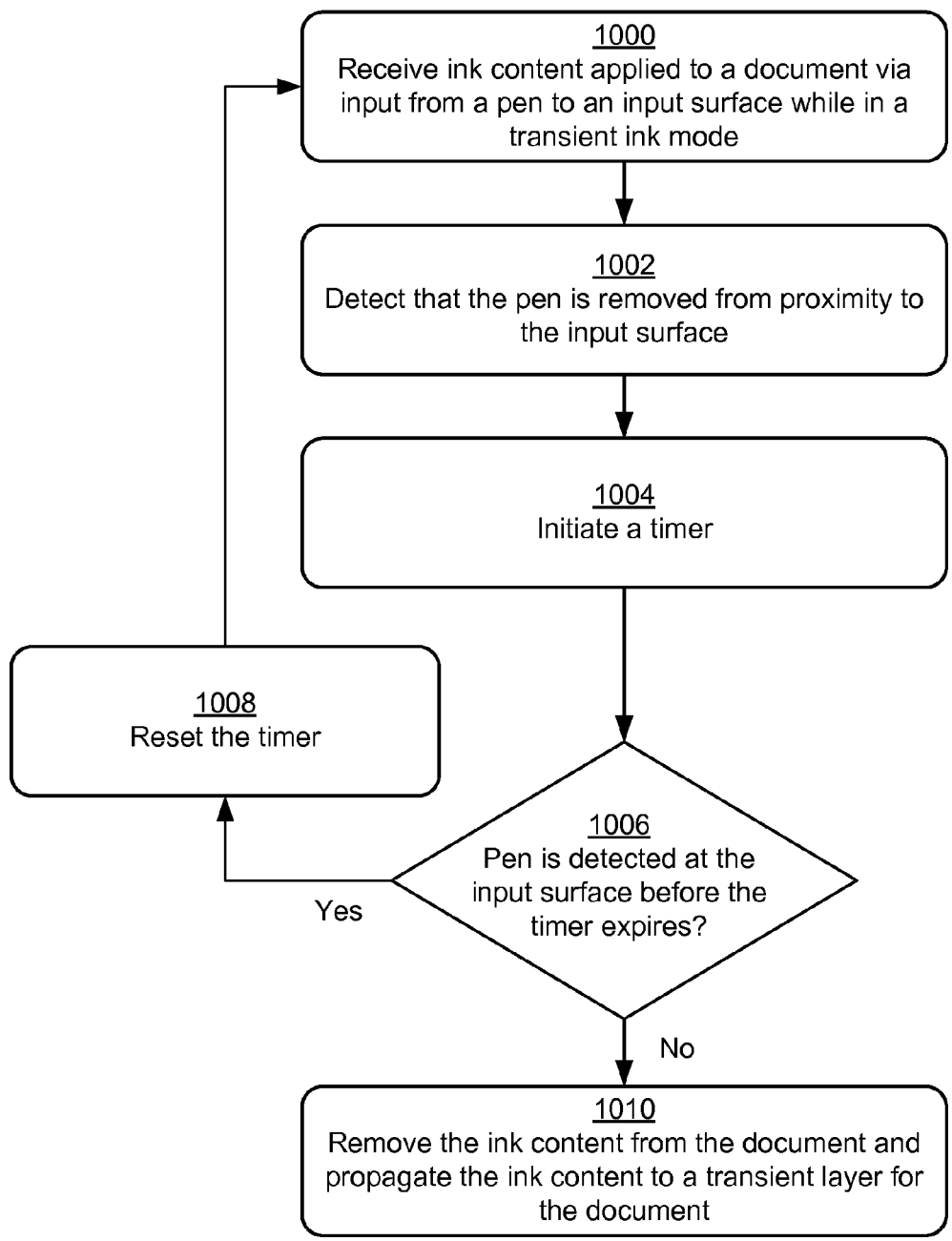
FIG. 10 is a flow diagram that describes steps in a method for a transient ink timer in accordance with one or more embodiments.

FIG. 10 is a flow diagram that describes steps in a method in accordance with one or more embodiments. The method, for instance, describes an example procedure for a transient ink timer in accordance with one or more implementations. In at least some implementations, the method represents an extension of the method described above with reference to FIG. 9.

Step 1000 receives ink content applied to a document via input from a pen to an input surface while in a transient ink mode. The ink module 118, for example, processes ink content received from the pen 124 to the display 110 as transient ink.

Step 1002 detects that the pen is removed from proximity to the input surface. For instance, the touch input device 116 detects that the pen 124 is not in contact with and is not hovering over a surface of the touch input device 116, e.g., the display 110.

Step 1004 initiates a timer. The timer, for example, is initiated in response to detecting that the pen is removed from proximity to the input surface. In at least some implementations, a visual representation of the timer is presented. For instance, the visual representation provides a visual cue that the timer is elapsing, and indicates a relative amount (e.g., percentage) of the timer that has elapsed. The visual representation, for example, is animated to visually convey that the timer is elapsing. One example of a visual representation of a timer is discussed above with reference to FIGS. 4 and 5.

Step 1006 ascertains whether the pen is detected at the input surface before the timer expires. For instance, the ink module 118 ascertains whether the pen 124 is detected is contact with and/or hovering over the touch input device 116 prior to expiry of the timer. If the pen is detected at the input surface prior to expiry of the timer ("Yes"), step 1008 resets the timer and the process returns to step 1000.

If the pen is not detected at the input surface prior to expiry of the timer ("No"), step 1010 removes the ink content from the document and propagates the ink content to a transient layer for the document. For instance, response to expiry of the timer, the transient ink content is removed from display and propagated to a transient data layer for the document that is separate from a primary content layer of the document. In at least some implementations, a new transient ink layer is created for the document, and the transient ink content is propagated to the new transient ink layer. Alternatively or additionally, the transient ink content is propagated to an existing transient ink layer. For example, the transient ink layer may represent an accumulation of transient ink provided by a user over multiple different interactions with the document and over a period of time.

As discussed above, the transient ink layer may be associated with a particular user, e.g., a user that applies the transient ink content to the document. Thus, the transient ink is linked to the particular user and may subsequently be accessed by the user.

Figure 11:
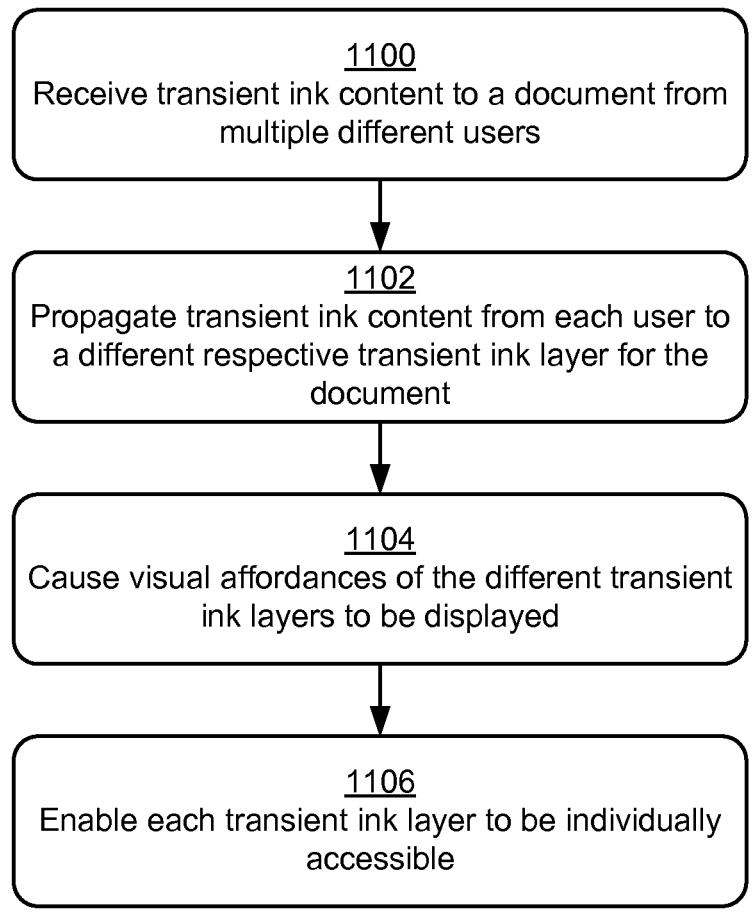
FIG. 11 is a flow diagram that describes steps in a method for propagating transient ink to different transient ink layers for different users in accordance with one or more embodiments.

FIG. 11 is a flow diagram that describes steps in a method in accordance with one or more embodiments. The method, for instance, describes an example procedure for propagating transient ink to different transient ink layers for different users in accordance with one or more implementations. In at least some implementations, the method represents an extension of the methods described above with reference to FIGS. 9 and 10.

Step 1100 receives transient ink content to a document from multiple different users. The transient ink content, for instance, is received during different interactivity sessions with the document that are individually associated with a different user. The document, for example, a shared among different users, such as part of a group collaboration on the document.

Step 1102 propagates transient ink content from each user to a different respective transient ink layer for the document. A different transient ink layer, for example, is generated for each user, and transient ink content applied by each user is propagated to a respective transient ink layer for each user.

Step 1104 causes visual affordances of the different transient ink layers to be displayed. Each transient ink layer, for example, is represented by a visual affordance that visually identifies the transient ink layer and a user linked to the transient ink layer. Examples of such affordances are discussed above with reference to ink flags.

Step 1106 enables each transient ink layer to be individually accessible. The ink module 118, for example, enables each transient ink layer to be accessed (e.g., displayed) separately from the other transient ink layers. In at least some implementations, a transient ink layer is accessible by selecting a visual affordance that represents the transient ink layer. Further, multiple transient ink layers may be accessed concurrently, such as by selecting visual affordances that identify the transient ink layers.

While implementations are discussed herein with reference to display of transient ink layers, it is to be appreciated that a transient ink layer may be accessible in various other ways and separately from a document to which the transient ink layer is bound. For instance, a transient ink layer may be printed, shared (e.g., emailed) separately from a document for which the transient ink layer is created, published to a website, and so forth.

Figure 12:
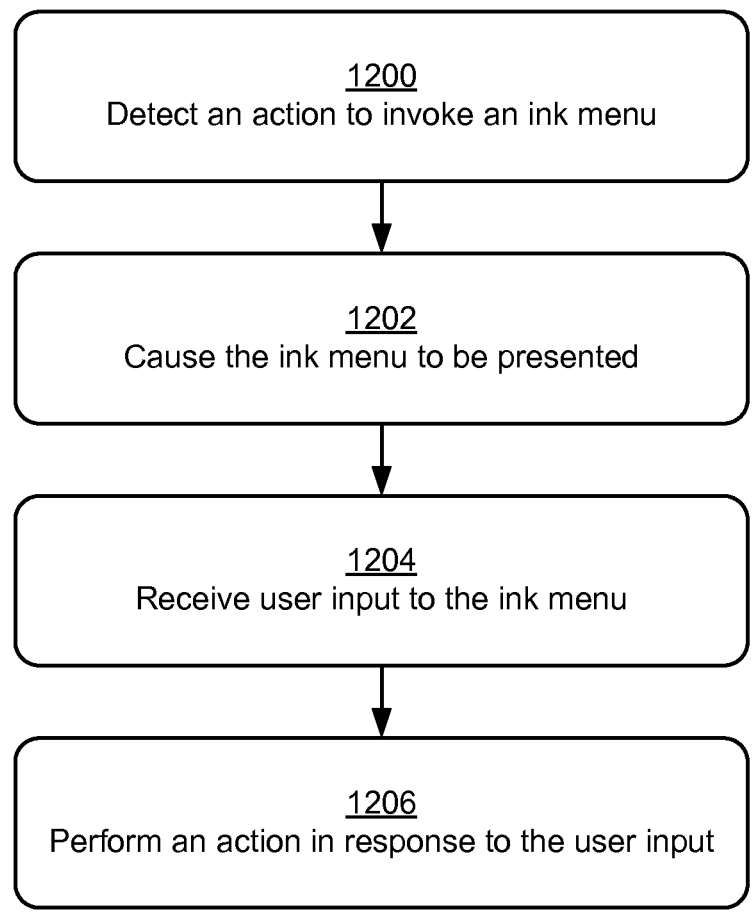
FIG. 12 is a flow diagram that describes steps in a method for presenting an ink menu in accordance with one or more embodiments.

FIG. 12 is a flow diagram that describes steps in a method in accordance with one or more embodiments. The method, for instance, describes an example procedure for presenting an ink menu in accordance with one or more implementations. In at least some implementations, the method represents an extension of the methods described above.

Step 1200 detects an action to invoke an ink menu. The ink module 118, for example, detects that a user requests an ink menu. For instance, as described in the scenario 800, a user may select a visual control (e.g., the ink flag 310) to request an ink menu. Alternatively or additionally, an ink menu can be automatically invoked in response to various events, such as the pen 124 detected in proximity to the surface of the display surface, an ink-related application and/or service being launched, an application and/or service querying a user to select an ink mode, and so forth.

Step 1202 causes the ink menu to be presented. The ink module 118, for example, causes the ink menu 802 to be displayed. In at least some implementations, a default set of functionalities is associated by the ink module 118 with the ink menu 802. Accordingly, different applications may modify the default set of functionalities, such as by adding a functionality to the default set of functionalities, removing a functionality from the default set of functionalities, and so forth. Thus, according to one or more implementations, the ink menu 802 is populated with a set of functionalities (e.g., selectable controls) based on a customized set of functionalities specified by and/or for an application that is currently in focus.

Step 1204 receives user input to the ink menu. For example, the ink module 118 detects that a user manipulates the pen 124 to select a control displayed as part of the ink menu 802.

Step 1206 performs an action in response to the user input. The ink module 118, for instance, causes an action to be performed based on which control is selected by the user. Examples of such actions include changing an ink mode, initiating ink playback, applying different ink formatting, and so forth.

Figure 13:
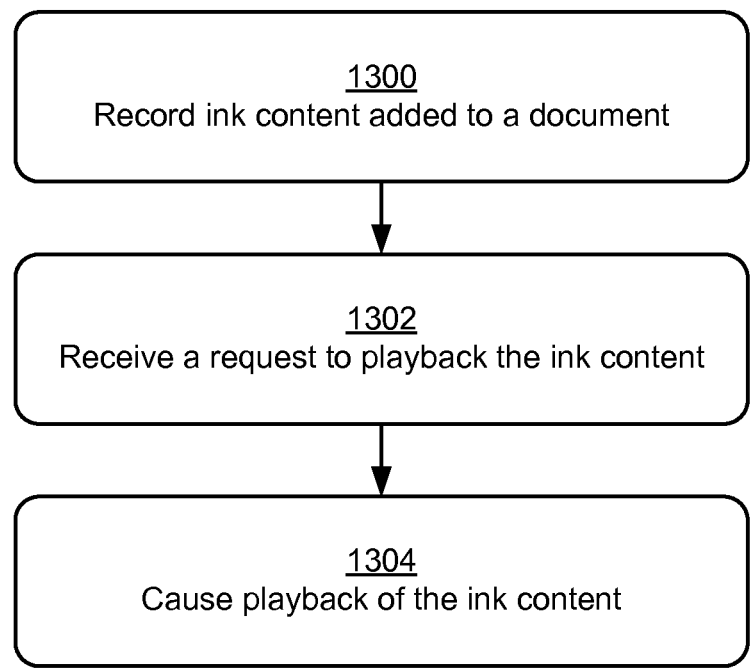
FIG. 13 is a flow diagram that describes steps in a method for ink playback in accordance with one or more embodiments.

FIG. 13 is a flow diagram that describes steps in a method in accordance with one or more embodiments. The method, for instance, describes an example procedure for ink playback in accordance with one or more implementations. In at least some implementations, the method represents an extension of the methods described above.

Step 1300 records ink content added to a document. The ink module 118, for example, records ink content as it is generated in the document, such as in real-time. For instance, a time-aligned record of ink content is generated that correlates ink content with a particular time at which the ink content is added to a document. In an example implementation, frames of ink content are generated that represent a timeline of ink content applied to a document over a period of time. In a transient ink implementation, the ink content is recorded as part of a transient ink layer for the document that is separate from primary content of the document.

In at least some implementations, the ink module 118 maintains records of different ink content for different documents and different users. Thus, ink content can be retrieved and played back on a per-user and/or per-document basis.

Step 1302 receives a request to playback the ink content. A user, for instance, requests playback of ink content, such as via selection of the playback control 804 presented as part of the ink menu 802.

Step 1304 causes playback of the ink content. For example, the ink module 118 receives the playback request, and initiates playback of the ink content. The ink playback may take a variety of different forms. For instance, the ink content may be played back on the display 110 as an animation that reproduces the ink content in a manner in which it was originally applied. In at least some implementations, transient ink content from a transient ink layer can be played back within a document to which the transient ink layer is bound. Alternatively or additionally, transient ink content can be played back separately from a linked document, such as part of a separate playback experience.

According to various implementations, playback of ink content represents a real-time playback that reflects characteristics of the original application of the ink content, such as a rate at which the ink content was originally applied. Further, ink content playback can be manipulated in various ways, such as a rewind of ink content, a fast forward of ink content, skipping between different sections of ink content, and so forth.

Figure 14:
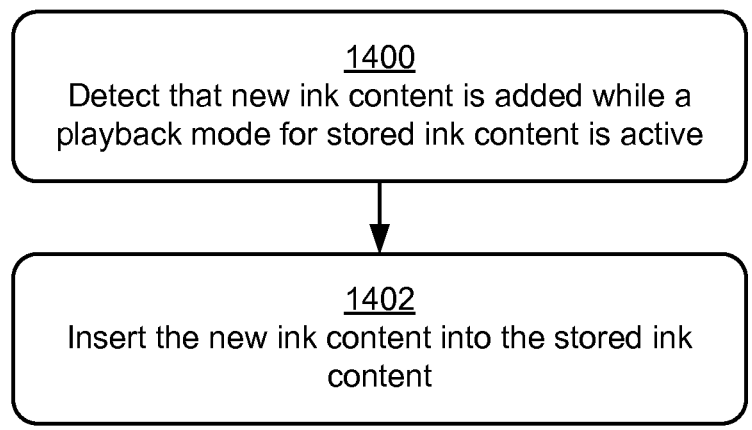
FIG. 14 is a flow diagram that describes steps in a method for inserting ink content in an ink playback mode in accordance with one or more embodiments.

FIG. 14 is a flow diagram that describes steps in a method in accordance with one or more embodiments. The method, for instance, describes an example procedure for inserting ink content in an ink playback mode in accordance with one or more implementations. In at least some implementations, the method represents an extension of the methods described above.

Step 1400 detects that new ink content is added while a playback mode for stored ink content is active. For instance, while playback of previously-recorded ink content within a document is in progress as described above, a user applies new ink content within document. Alternatively or additionally, a user pauses and/or stops playback of previously-recorded ink content, and adds new ink content while the playback is paused and/or stopped.

Step 1402 inserts the new ink content into the stored ink content. The ink module 118, for example, inserts the new ink content into the stored ink content at a temporal point at which the new ink content was applied during playback of the stored ink content. Thus, the new ink content becomes integrated into the stored ink content such that the new ink content is presented during a subsequent playback of the stored ink content.

As an alternative or addition to insertion of new ink content, portions of recorded ink content can be removed during playback. For instance, a user can use an erase functionality to erase portions of stored ink content such that during a subsequent playback of the stored ink content, the erased portions are not presented.

The next portion of this discussion presents example implementation scenarios and procedures for ink versioning in accordance with various implementations. Generally, ink versioning relates to the ability to discern an ink annotation as it relates to a document which it annotates. If a document changes (e.g., in length, size, content, and so on), techniques for ink versioning seek to maintain a correlation between an ink annotation and a portion of a document to which the annotation relates.

Figure 15:
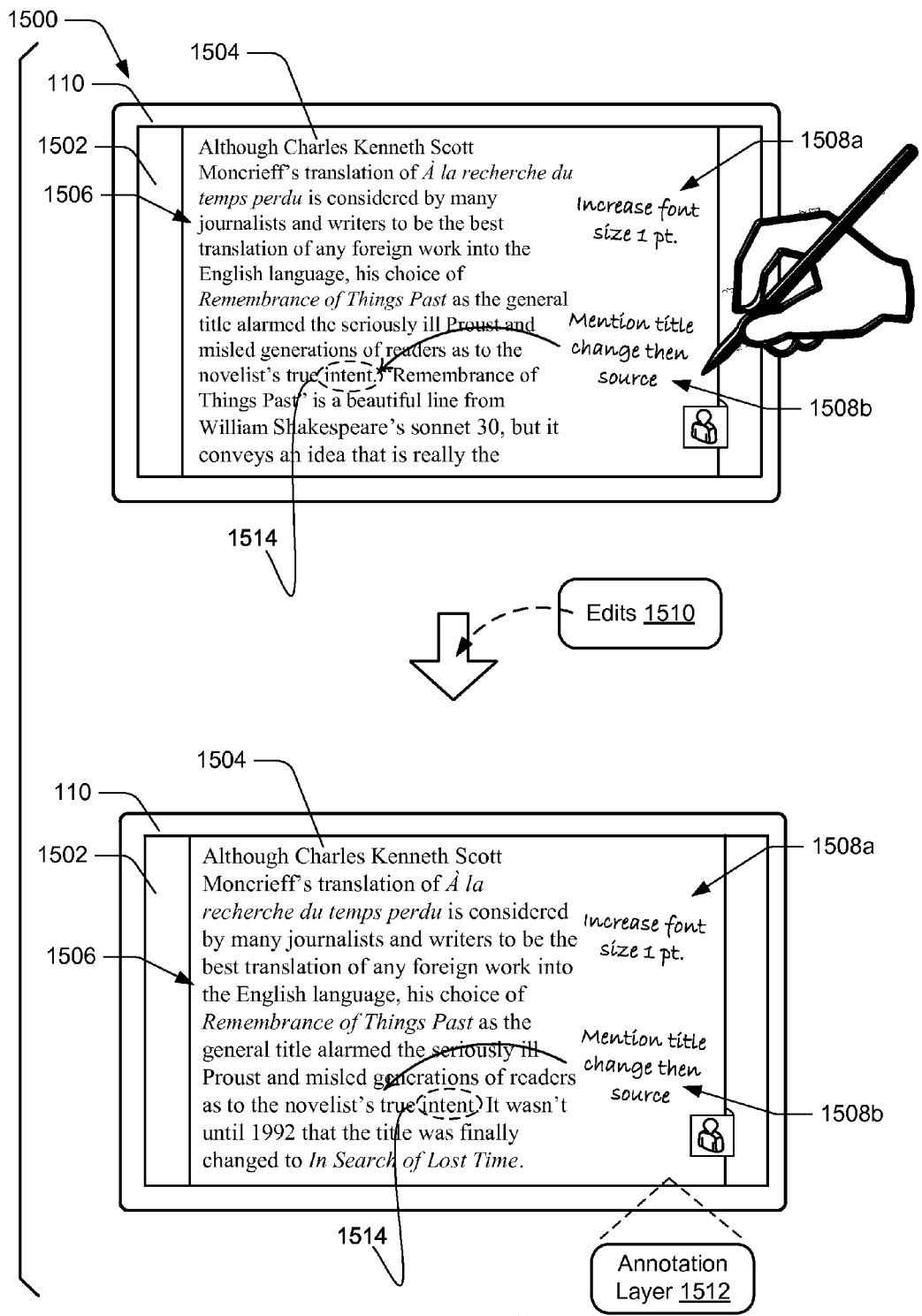
FIG. 15 depicts an example implementation scenario for ink versioning in accordance with one or more embodiments.

FIG. 15 depicts an example implementation scenario 1500 for ink versioning in accordance with one or more implementations. The upper portion of the scenario 1500 includes a GUI 1502 with a document 1504 displayed on the display 110. Generally, the GUI 1502 represents a GUI for a particular functionality, such as an instance of the applications 106. The document 1504 includes primary content 1506, which in this example includes text content.

In the upper portion of the scenario 1500, a user provides transient ink annotation to the document 1504 in a transient ink mode. The transient ink annotation includes an annotation 1508*a* and an annotation 1508*b*, which specify various proofreading suggestions for editing the primary content 1506. For instance, the annotation 1508*a* suggests increasing font size of the primary content 1506, and the annotation 1508*b* suggests adding content at a particular point in the primary content 1506.

Proceeding to the lower portion of the scenario 1500, a user applies edits 1510 to the document 1504 to increase a font size of the primary content 1506 and to insert a sentence at a point identified by the annotation 1508*b*. As illustrated, the edits 1510 cause changes to the primary content 1506 such that the primary content is reflowed (e.g., reformatted) within the document 1504.

Further, based on the edits 1510, the annotation 1508*a* is no longer relevant since the font size has been increased, and the annotation 1508*b* does not retain its original spatial context indicated in the upper portion of the scenario 1500. For instance, after the edits 1510 the annotation 1508*b* points to a portion of the primary content 1506 that is not pertinent to the suggestion of the annotation 1508*b*. Thus, the edits 1510 have caused the annotations 1508*a*, 1508*b* to lose their context within the document 1504. Accordingly, an annotation layer 1512 is generated for the document 1504. Generally, the annotation layer 1512 represents a snapshot of the document 1504 including the primary content 1506 and the annotations 1508*a*, 1508*b* as illustrated in the upper portion of the scenario 1500 and before the edits 1510 are applied.

According to various implementations, a threshold change in a document is specified that when met and/or exceeded, causes the annotation layer 1512 to be generated. The threshold change can be specified in various ways, such as a threshold distance between the annotation 1508*b* and adjacent text of the primary content 1506. For example, when the annotation 1508*b* is initially generated as in the upper portion of the scenario 1500, the annotation 1508*b* is adjacent to a portion of text 1514 of the primary content 1506. However, application of the edits 1510 causes the portion of text 1514 to be moved elsewhere within the document 1504 such that the portion of text 1514 is no longer adjacent to the annotation 1508*b*. In the scenario 1500, the portion of text 1514 has moved a threshold distance from the annotation 1508*b* such that the annotation layer 1512 is generated. The threshold distance may be specified in various ways, such as in pixels, distance on a display (e.g., in millimeters, centimeters, and so on), distance with reference to sections of the document 1504, and so forth.

A threshold change in a document may be specified in various other ways, such as a particular format change for primary content, a number of format changes for primary content, an insertion and/or deletion of a specified portion of primary content, and so forth. The scenario 1600 discussed below provides further details concerning the annotation layer 1512.

Figure 16:
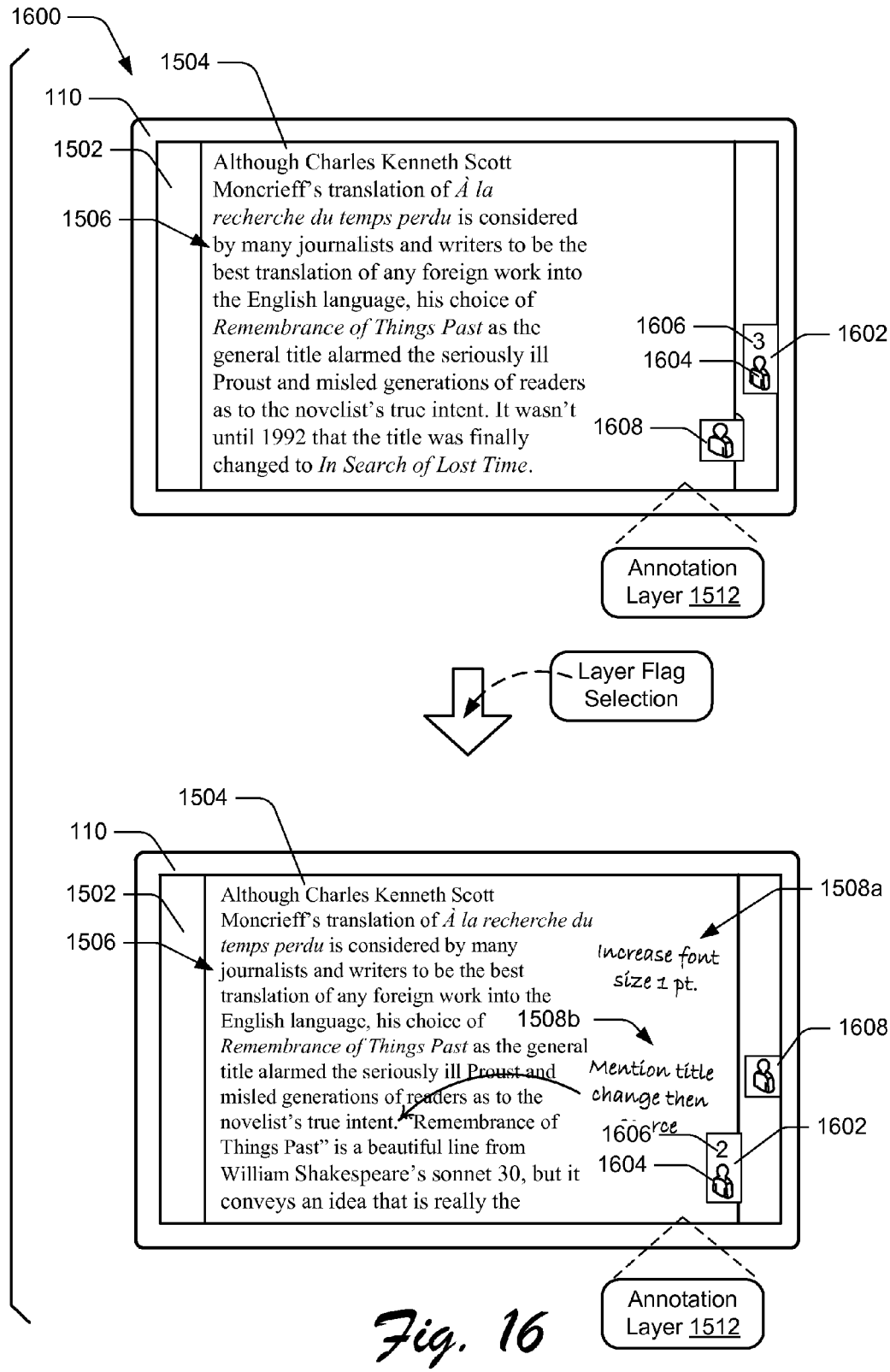
FIG. 16 depicts an example implementation scenario for ink versioning in accordance with one or more embodiments.

FIG. 16 depicts an example implementation scenario 1600 for ink versioning in accordance with one or more implementations. The scenario 1600, for example, represents a continuation of the scenario 1500, above. The upper portion of the scenario 1500 includes the GUI 1502 with the document 1504 (introduced above) displayed on the display 110. The version of the document presented in the upper portion of the scenario represents the document 1504 with the edits 1510 applied to the primary content 1506, such as depicted in the lower portion of the scenario 1500. Notice further that the annotations 1508*a*, 1508*b* are removed. According to various implementations, when the annotation layer 1512 is generated, existing annotations of the document 1504 are saved to the annotation layer 1512 and removed from display as part of the primary content 1506.

Further presented in the upper portion of the scenario 1600 is a layer flag 1602, which represents a visual cue that the document 1504 includes an annotation layer, e.g., the annotation layer 1512. The layer flag 1602 includes a user icon 1604 and a layer count 1606. The user icon 1604 represents a particular user associated with the annotation layer 1512, e.g., a user whose interaction with the document 1504 caused the annotation layer 1512 to be generated. The layer count 1606 specifies a number of annotation layers linked to the document 1504. The number of annotation layers identified by the layer count 1606 may correspond to a number of annotation layers generated by the user associated with the user icon 1604, or may correspond to an aggregate number of annotation layers linked to the document 1504 and for multiple users.

Notice that in the scenario 1600, the layer flag 1602 is displayed in a different region of the GUI 1502 than is an ink flag 1608. The layer flag 1602, for instance, is pinned to an outer edge of the GUI 1502, whereas the ink flag 1608 is pinned to an edge of the document 1504. According to various implementations, this difference in positioning provides a further visual cue that the document 1504 is linked to one or more annotation layers.

Proceeding to the lower portion of the scenario 1600, a user selects the layer flag 1602 (e.g., using the pen 124 and/or other suitable input technique), which causes the annotation layer 1512 to be displayed in the GUI 1502. For instance, the snapshot of the document 1504 stored as part of the annotation layer 1512 is retrieved and displayed. In this particular implementation, the annotation layer replaces the current version of the document 1504 in the GUI 1502. As discussed below and illustrated with reference to FIG. 17, however, an annotation layer may be illustrated along with a current version of a document.

The scenario 1600 further depicts that the layer flag 1602 is attached to an edge of the annotation layer 1512, which provides a visual affordance that the annotation layer 1512 is displayed. For instance, selection of the layer flag 1602 in the upper portion of the scenario 1600 causes the layer flag 1602 and the ink flag 1608 to switch positions in the GUI 1502. Further, the layer count 1606 is reduced (e.g., to "2") to indicate that other annotation layers for the document 1504 are available. For instance, a further selection of the layer flag 1602 while the annotation layer 1512 is displayed will cause a different annotation layer to be retrieved and displayed. A user, for example, can scroll through multiple annotation layers by selecting the layer flag 1602 multiple times. In at least some implementations, the annotation layers are not editable and represent static representations of historical versions of the document 1504.

According to one or more implementations, a user may return to a current version of the document 1504 by selecting the ink flag 1608 while the annotation layer 1512 is displayed. For instance, selection of the ink flag 1608 in the lower portion of the scenario 1600 causes a return to the upper portion of the scenario 1600.

FIG. 17 depicts an example implementation scenario 1700 for presenting a current version of a document along with an annotation layer in accordance with one or more implementations. The scenario 1700, for example, represents a variation of the scenario 1600, above. The scenario 1600 includes the GUI 1502 with the document 1504 (introduced above) displayed on the display 110. Generally, the document 1504 represents a current version of the document 1504 (e.g., a "live" version), and a user may interact with document 1504 to edit the primary content 1506 in various ways. The document 1504 includes the ink flag 1608, which provides a visual affordance that the document 1504 is a current version, and that the user may edit the document 1504 as well as provide ink annotations to the document 1504.

Displayed to the right of the document 1504 in the GUI 1502 is the annotation layer 1512, details of which are described above. The annotation layer 1504 includes the layer flag 1602 with the layer count 1606 indicating that 2 other annotation layers are available to be accessed in addition to the annotation layer 1512. As referenced above, the layer flag 1602 is selectable to cause other annotation layers to be displayed, such as to navigate through different annotation layers.

According to various implementations, if a user edits the document 1504 such that the edits meet or exceed a threshold change, a new annotation layer will be created and added to the group of annotation layers to the right. Thus, the scenario 1700 illustrates that a current version of a document and an annotation layer of a document may be displayed together, e.g., side-by-side. In at least some implementations, annotation layers are grouped (e.g., stacked) in a chronological order according to a date and time on which they were created. A user is thus provided with an edit history and an annotation history for a document, which gives the user context as to when and why certain changes to a document occurred.

Figure 18:
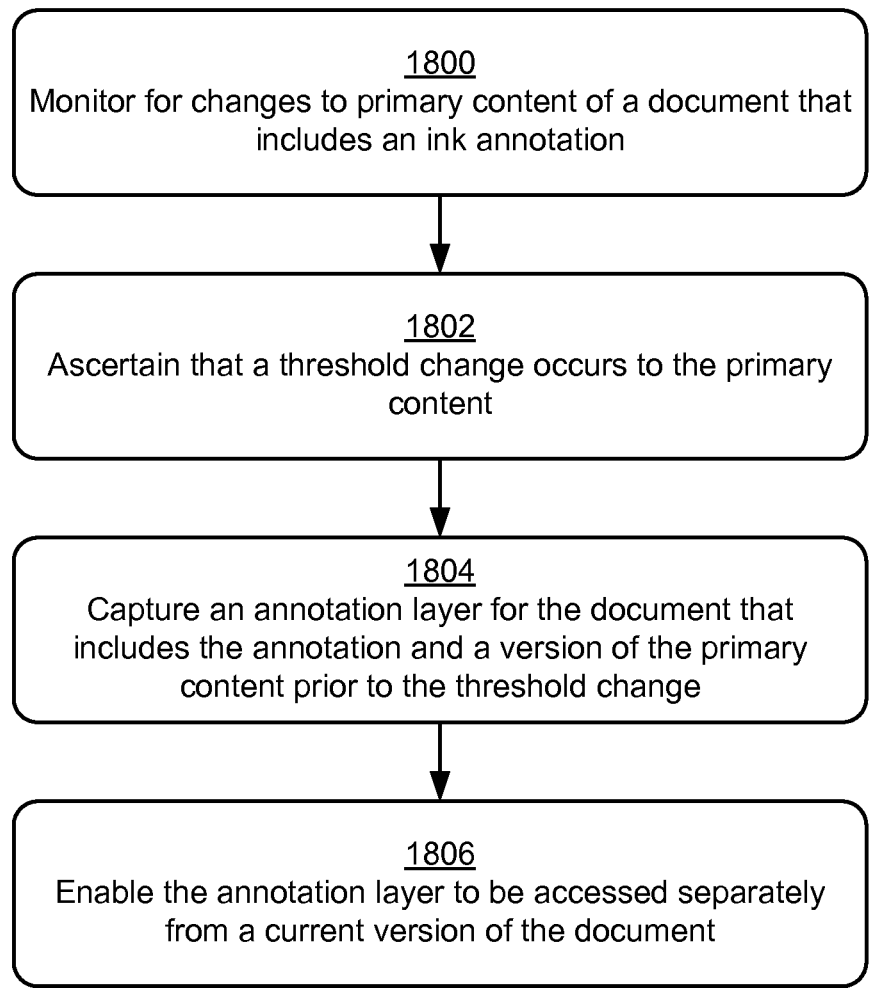
FIG. 18 is a flow diagram that describes steps in a method for ink versioning in accordance with one or more embodiments.

FIG. 18 is a flow diagram that describes steps in a method in accordance with one or more embodiments. The method, for instance, describes an example procedure for ink versioning in accordance with one or more implementations. In at least some implementations, the method represents an extension of the methods described above.

Step 1800 monitors for changes to primary content of a document that includes an ink annotation. The ink module 118, for example, monitors a state of a document for edits that cause changes to the document.

Step 1802 ascertains that a threshold change occurs to the primary content. Generally, the threshold change refers to a change to primary content of the document. The threshold change, for instance, refers to a difference between an edited document and a version of the document prior to the edits being applied. As referenced above, a threshold change can be specified based on various factors, such as an amount of content that is added or removed, a threshold movement of content (such as measured in pixel displacement, distance moved, and so forth), a number of lines of text that are moved, a threshold distance between an ink annotation and primary content to which the ink annotation refers, and so forth.

Step 1804 captures an annotation layer for the document that includes the annotation and a version of the primary content prior to the threshold change. For instance, the annotation layer is captured and saved responsive to ascertaining that the threshold change occurs. The annotation layer, for example, represents a snapshot of the document as it appears prior to the threshold change being applied to the document.

Generally, an annotation layer can be captured in various ways. For instance, as a document is being annotated and edited, cached versions of the document can be periodically saved. When edits to the document exceed the threshold change, a cached version of the document from prior to the threshold change is saved as an annotation layer that is linked to the document. Alternatively or additionally, when edits to a document are received (e.g., via user input) that cause a threshold change to the document, an annotation layer for the document is captured prior to the edits being applied.

Step 1806 enables the annotation layer to be accessed separately from a current version of the document. The annotation, for instance, is removed from the current version of the document and is saved as part of the annotation layer and can be accessed along with the annotation layer. Example ways of enabling access to an annotation layer are presented above and below.

Figure 19:
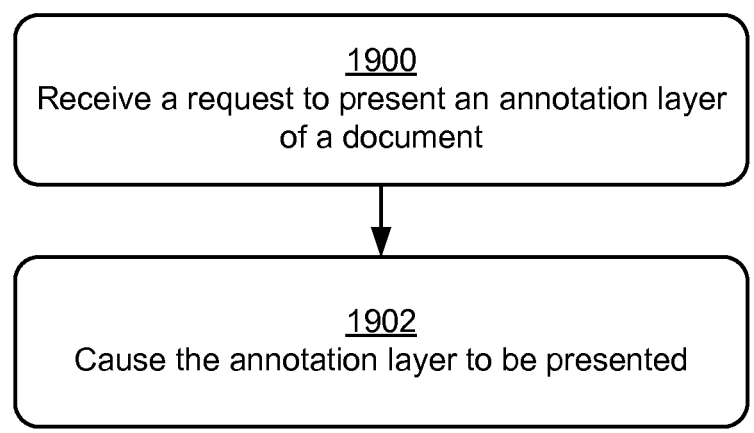
FIG. 19 is a flow diagram that describes steps in a method for enabling access to an annotation layer in accordance with one or more embodiments.

FIG. 19 is a flow diagram that describes steps in a method in accordance with one or more embodiments. The method, for instance, describes an example procedure for enabling access to an annotation layer in accordance with one or more implementations. In at least some implementations, the method represents an extension of the methods described above.

Step 1900 receives a request to present an annotation layer of a document. The ink module 118, for example, receives a user request to view an annotation layer for a document, such as while a current version of the document is displayed. As referenced above, an annotation layer may be presented in response to selection of the layer flag 1602.

Step 1902 causes the annotation layer to be presented. For instance, the ink module 118 retrieves the annotation layer and causes the annotation layer to be displayed. As discussed above, the annotation layer can replace a current version of the document in a display region, or can be presented along with the current version of the document in a display region. As further discussed above, multiple annotation layers may be generated for a document, and thus the multiple annotation layers may be individually accessible and/or accessed as a group.

The next portion of this discussion presents example implementation scenarios and an example procedure for ink notes in accordance with various implementations. Generally, ink notes provide ways of preserving ink as notes that can be saved, shared, and accessed in various ways.

Figure 20:
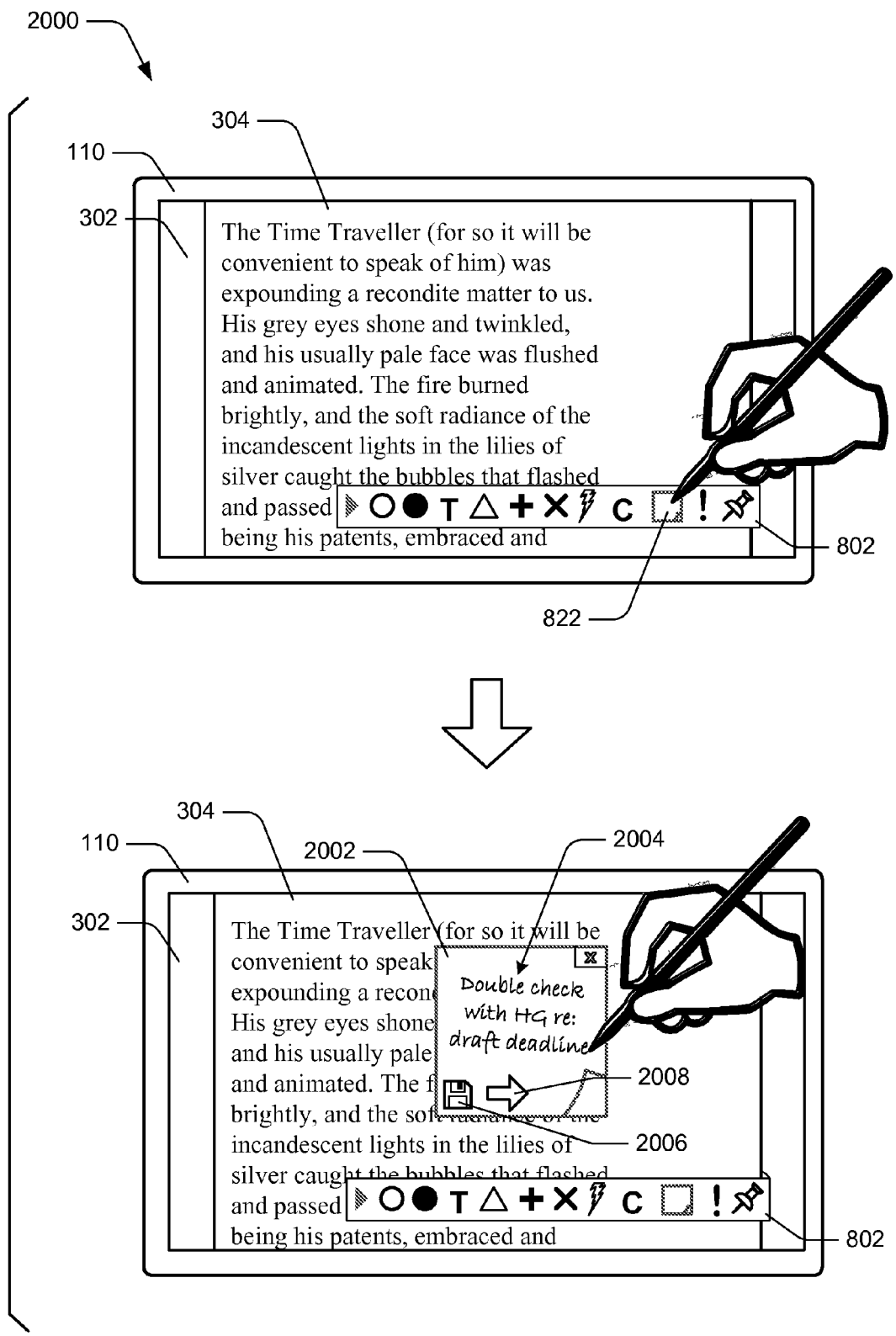
FIG. 20 depicts an example implementation scenario for ink notes in accordance with one or more embodiments.

FIG. 20 depicts an example implementation scenario 2000 for ink notes in accordance with one or more implementations. The scenario 2000, for example, represents a continuation of the scenarios described above. The upper portion of the scenario 2000 includes the GUI 302 with the document 304 and the ink menu 802 (introduced above) displayed on the display 110.

In the upper portion of the scenario 2000, a user selects the ink note control 822. For instance, the user taps the ink note control 822, and/or drags the ink note control 822 from the ink menu 802 into the body of the document 304.

Proceeding to the lower portion of the scenario 2000, and responsive to the user selection of the ink note control 822, an ink note 2002 is presented in the GUI 302. Generally, the ink note 2002 represents an electronic canvas on which notes can be applied using ink. A user then applies ink content 2004 to the ink note 2002.

In at least some implementations, the scenario 2000 occurs while the GUI 302 is in a transient ink mode. Accordingly, ink content applied to the document 304 itself will behave according to the transient ink mode. However, ink content applied within the ink note 2002 behaves according to an ink note mode. Thus, the ink note 2002 represents a separate inking environment from the document 304, and thus different behaviors apply to the ink content 2004 than to ink content within the document 304.

The ink note 2002 includes a save control 2006 and a share control 2008. According to various implementations, selecting the save control 2006 causes the ink content 2004 to be saved to a particular location, such as a pre-specified data storage location. In at least some implementations, a single selection of the save control 2006 causes the ink content 2004 to be saved and the ink note 2002 to be removed from display such that a user may return to interacting with the document 304.

The share control 2008 is selectable to share the ink content 2004, such as with another user. For instance, selecting the share control 2008 causes the ink content 2004 to be automatically propagated to a message, such as the body of an email message, an instant message, a text message, and so forth. A user may then address and send the message to one or more users. Alternatively or additionally, selecting the share control 2008 may cause the ink content 2004 to be posted to a web-based venue, such as a social networking service, a blog, a website, and so forth. According to various implementations, functionality of the share control 2008 is user configurable such that a user may specify behaviors caused by selection of the share control 2008.

Figure 21:
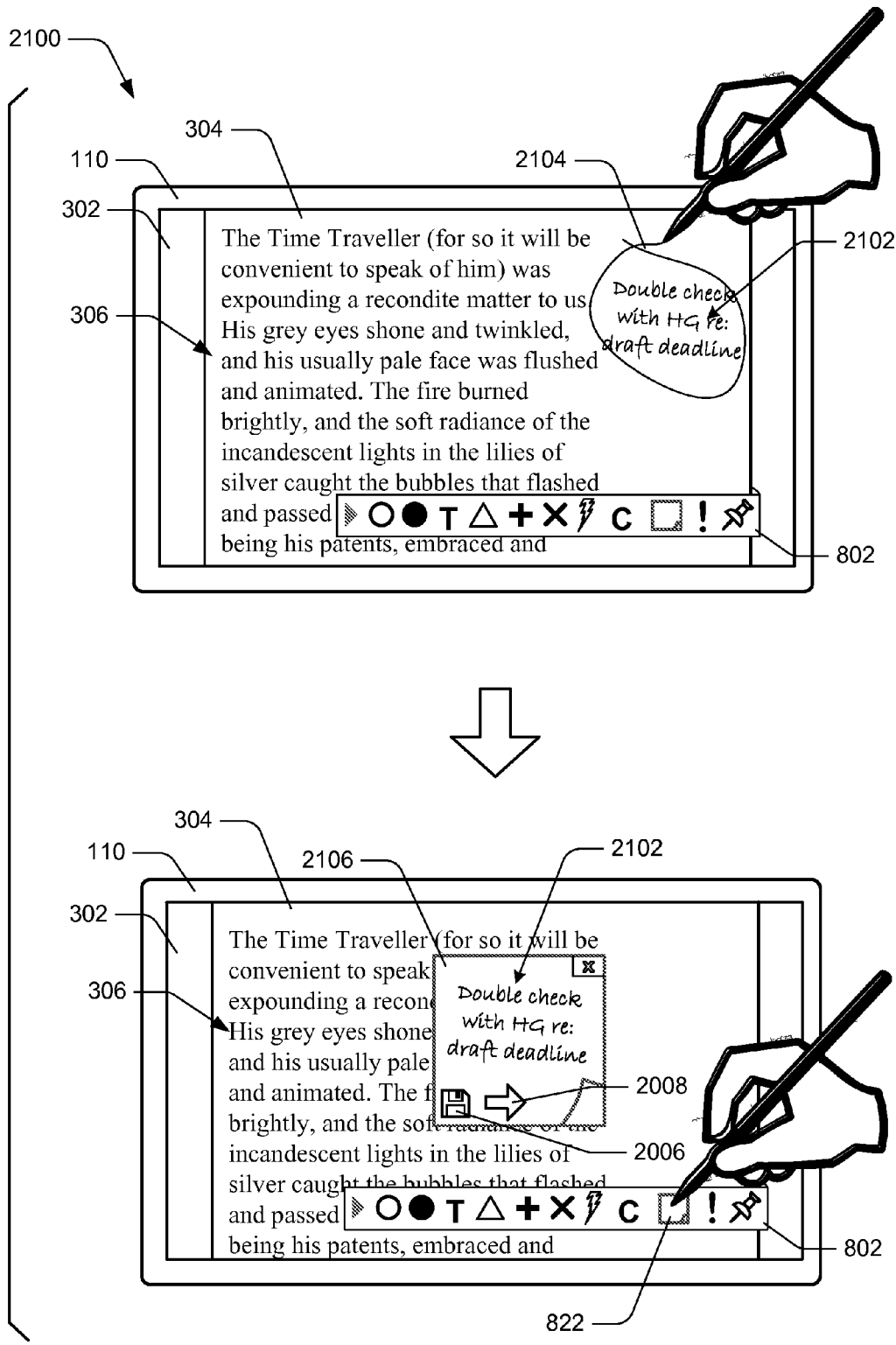
FIG. 21 depicts an example implementation scenario for ink notes in accordance with one or more embodiments.

FIG. 21 depicts an example implementation scenario 2100 for ink notes in accordance with one or more implementations. The scenario 2100, for example, represents a continuation and/or variation of the scenarios described above. The upper portion of the scenario 2100 includes the GUI 302 with the document 304 and the ink menu 802 (introduced above) displayed on the display 110.

In the upper portion of the scenario 2100, a user applies ink content 2102 to the document 302 and then applies a selection action 2104 to the ink content 2102. In this particular example, the selection action 2104 is implemented as inking a closed loop around the ink content 2102. It is to be appreciated, however, that a wide variety of other selection actions may be employed in accordance with various embodiments.

Proceeding to the lower portion of the scenario 2100, the user selects the ink note control 822, such as by tapping on the ink note control 822 and/or dragging the ink note control 822 out of the ink menu 802. In response, an ink note 2106 is automatically generated and populated with the ink content 2102. The ink module 118, for example, detects that the ink content 2102 is selected via the selection action 2104, and thus populates the ink content 2102 to the ink note 2106. Thus, the selection action 2104 followed by the selection of the ink note control 822 is interpreted as a command to generate the ink note 2106 and populate the ink note 2106 with the ink content 2102.

In this particular example, the ink content is moved (e.g., cut and paste) from the body of the document 304 into the ink note 2106. In some alternative implementations, the ink content is copied into the ink note 2106 such that the ink content 2102 remains in the body of the document 304. The user may then save the ink note 2106 by selecting the save control 2006, and may share the ink content 2102 by selecting the share control 2008. Example attributes and actions of the save control 2006 and the share control 2008 are described above.

While the scenario 2100 is discussed with reference to populating the ink content 2102 to the ink note 2106, it is to be appreciated that a wide variety of other content may be populated to the ink note 2106. For instance, a user may select a portion of the primary content 306 from the document 304 (e.g., text content), and a subsequent selection of the ink note control 822 would cause the ink note 2102 to be generated and populated with the selected primary content. As another example implementation, a combination of ink content and primary content can be selected, and a subsequent selection of the ink note control would cause the ink note 2102 to be generated and populated with both the selected ink content and primary content.

The scenarios described above generally describe that ink note functionality is invocable via selection of the ink note control 822. In additional or alternative implementations, ink note functionality is invocable in other ways, such as in response to a dragging gesture from anywhere within the ink menu 802 into the body of the document 304, a custom gesture applied anywhere within the GUI 302, a gesture involving a combination of finger touch input and pen input, a voice command, a touchless gesture, and so forth.

Thus, the scenario 2100 illustrates that techniques discussed herein reduce a number of user interactions required to propagate content to a note (e.g., an ink note), since a user may simply select existing content and invoke an ink note functionality to populate the existing content to an ink note.

Figure 22:
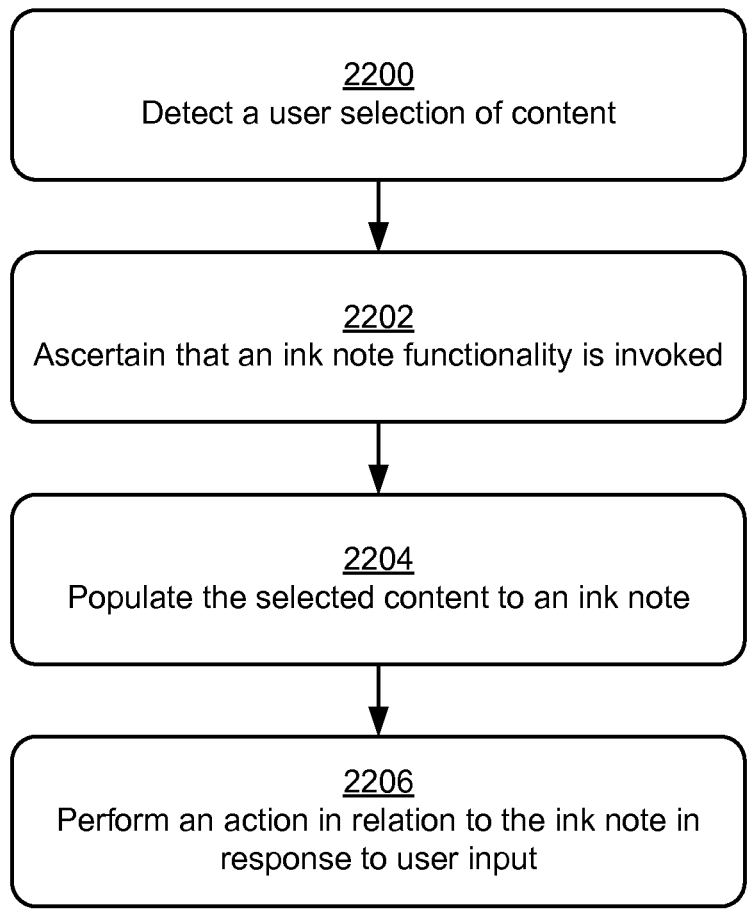
FIG. 22 is a flow diagram that describes steps in a method for generating an ink note in accordance with one or more embodiments.

FIG. 22 is a flow diagram that describes steps in a method in accordance with one or more embodiments. The method, for instance, describes an example procedure for generating an ink note in accordance with one or more implementations. In at least some implementations, the method represents an extension of the methods described above.

Step 2200 detects a user selection of content. The ink module 118, for example, ascertains that a user selects a portion of ink content, primary content, combinations thereof, and so forth.

Step 2202 ascertains that an ink note functionality is invoked. Various ways of invoking ink note functionality are detailed above.

Step 2204 populates the selected content to an ink note. For example, the ink module 118 generates an ink note and populates (e.g., copies or moves) the selected content to the ink note. In at least some implementations, the ink note is generated and the selected content is populated to the ink note automatically and in response to a single user invocation of ink note functionality, e.g., a single user action.

Step 2206 performs an action in relation to the ink note in response to user input. For instance, a user provides input that causes the ink note to be saved, to be shared, to be deleted, and so forth. Examples of user input include user selection of a selectable control, a user applying an ink and/or touch gesture, input via an input mechanism 112, and so forth.

The next portion of this discussion presents an example implementation scenario and procedure for using ink for emphasis in accordance with various implementations. Generally, ink for emphasis provides ways of using ink for temporary purposes, such as for identifying content, highlighting content, for temporary communication, and so forth.

Figure 23:
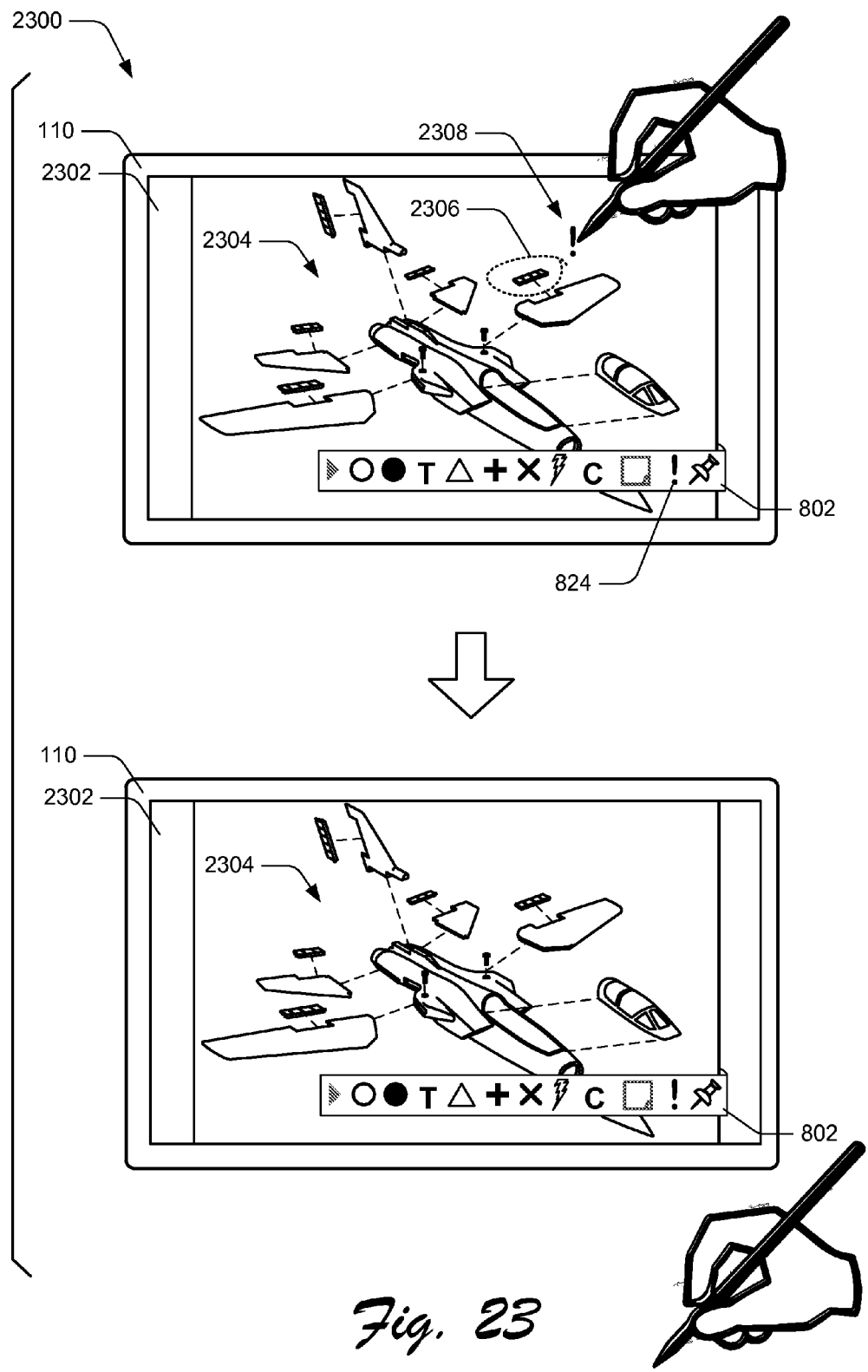
FIG. 23 depicts an example implementation scenario for ink for emphasis in accordance with one or more embodiments.

FIG. 23 depicts an example implementation scenario 2300 for ink for emphasis in accordance with one or more implementations. The scenario 2300, for example, represents a continuation and/or variation of the scenarios described above. The upper portion of the scenario 2300 includes a GUI 2302 with primary content 2304 and the ink menu 802 (introduced above) displayed on the display 110.

Further to the scenario 2300, a user applies emphasis ink 2306 to identify and/or emphasize a portion of the primary content 2304. The user, for instance, selects the emphasis control 824, which causes a transition to an emphasis ink mode. The user then applies the emphasis ink 2306 while in the emphasis ink mode. Notice that when the pen 124 is hovered over the display 110, a hover target 2308 is presented that identifies the emphasis ink mode. As referenced above, different hover targets can be displayed that identify a particular ink mode that is active, such as utilizing visuals based on the respective controls presented in the ink menu 802.

Proceeding to the lower portion of the scenario 2300, the user removes the pen 124 from proximity to the display 110. In response to detecting that the pen is not in proximity to the display 110, the emphasis ink 2306 fades and disappears from the GUI 2302. For instance, as long as the pen 124 is detected in proximity to the display 110, the emphasis ink 2306 remains displayed. However, when the pen 124 is not detected in proximity to the display 110, a first timer begins running while the emphasis ink 2306 is displayed. When the first timer expires, a second timer begins running during which the emphasis ink 2306 fades from the GUI 2302. When the second timer expires, the emphasis ink 2306 disappears, e.g., is removed from display. The emphasis ink 2306, for example, is not saved as part of primary content, a transient content layer, and so forth. Thus, the emphasis ink 2306 may be used for various purposes, such as to identify and/or emphasize content during a meeting or other interaction, as part of a temporary communication (e.g., during an online meeting), and so forth.

Figure 24:
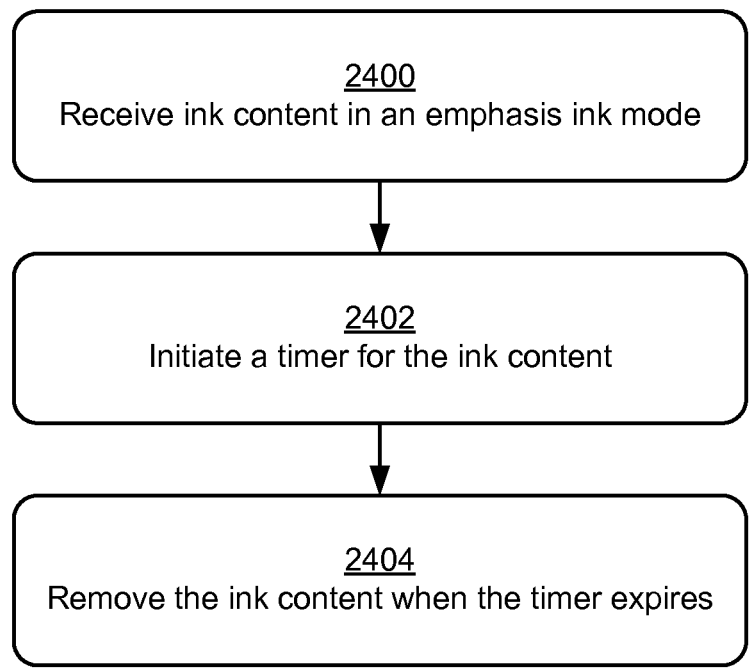
FIG. 24 is a flow diagram that describes steps in a method for ink for emphasis in accordance with one or more embodiments.

FIG. 24 is a flow diagram that describes steps in a method in accordance with one or more embodiments. The method, for instance, describes an example procedure for ink for emphasis in accordance with one or more implementations. In at least some implementations, the method represents an extension of the methods described above.

Step 2400 receives ink content in an emphasis ink mode. The ink module 118, for example, detects that a user applies ink content while an emphasis ink mode is active. According to various implementations, an emphasis mode is activatable by a user, such as in response to selection of the emphasis control 824.

Step 2402 initiates a timer for the ink content. For instance, one or more timers are initiated while the ink content is displayed. The timers, for example, are specific to the emphasis ink mode. In at least some implementations, the timer is initiated in response to detecting that the pen 124 is not detected in proximity to the display 110, such as after a user applies the ink content using the pen 124.

Step 2404 removes the ink content when the timer expires. The ink content, for instance, fades and is automatically removed from display in response to expiry of one or more timers and independent of user input to remove the ink content.

Having described some example implementation scenarios and procedures for ink modes, consider now a discussion of an example system and device in accordance with one or more embodiments.

Example System And Device

Figure 25:
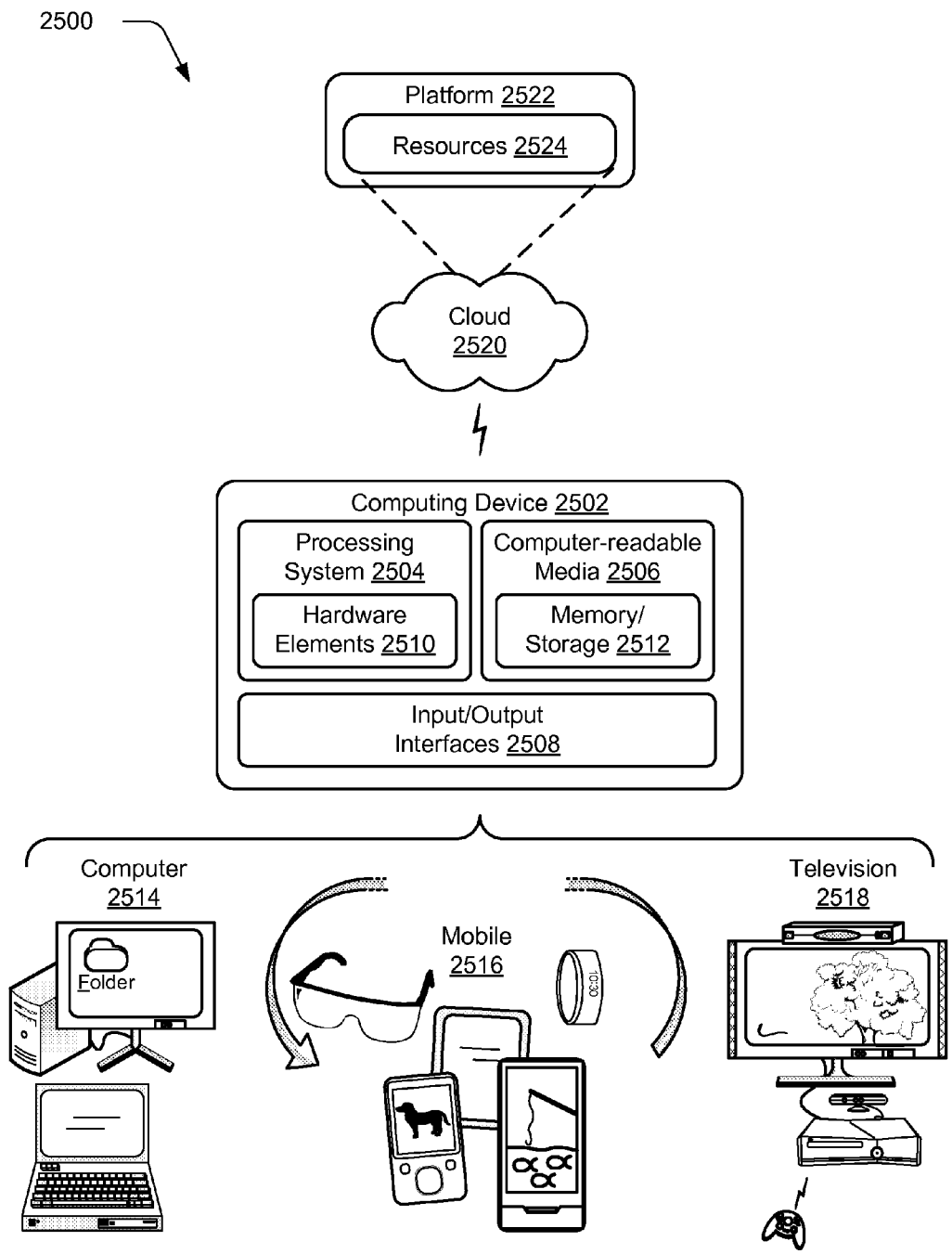
FIG. 25 illustrates an example system and computing device as described with reference to FIG. 1, which are configured to implement embodiments of techniques described herein.

FIG. 25 illustrates an example system generally at 2500 that includes an example computing device 2502 that is representative of one or more computing systems and/or devices that may implement various techniques described herein. For example, the client device 102 discussed above with reference to FIG. 1 can be embodied as the computing device 2502. The computing device 2502 may be, for example, a server of a service provider, a device associated with the client (e.g., a client device), an on-chip system, and/or any other suitable computing device or computing system.

The example computing device 2502 as illustrated includes a processing system 2504, one or more computer-readable media 2506, and one or more Input/Output (I/O) Interfaces 2508 that are communicatively coupled, one to another. Although not shown, the computing device 2502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2504 is representative of functionality to perform one or more operations using hardware. Accordingly, the processing system 2504 is illustrated as including hardware element 2510 that may be configured as processors, functional blocks, and so forth. This may include implementation in hardware as an application specific integrated circuit or other logic device formed using one or more semiconductors. The hardware elements 2510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2506 is illustrated as including memory/storage 2512. The memory/storage 2512 represents memory/storage capacity associated with one or more computer-readable media. The memory/storage 2512 may include volatile media (such as random access memory (RAM)) and/or nonvolatile media (such as read only memory (ROM), Flash memory, optical disks, magnetic disks, and so forth). The memory/storage 2512 may include fixed media (e.g., RAM, ROM, a fixed hard drive, and so on) as well as removable media (e.g., Flash memory, a removable hard drive, an optical disc, and so forth). The computer-readable media 2506 may be configured in a variety of other ways as further described below.

Input/output interface(s) 2508 are representative of functionality to allow a user to enter commands and information to computing device 2502, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 2502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types.

The terms "module," "functionality," "entity," and "component" as used herein generally represent software, firmware, hardware, or a combination thereof The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 2510 and computer-readable media 2506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 2510. The computing device 2502 may be configured to implement particular instructions and/or functions corresponding to the software and/or hardware modules. Accordingly, implementation of modules that are executable by the computing device 2502 as software may be achieved at least partially in hardware, e.g., through use of computer-readable storage media and/or hardware elements 2510 of the processing system. The instructions and/or functions may be executable/operable by one or more articles of manufacture (for example, one or more computing devices 2502 and/or processing systems 2504) to implement techniques, modules, and examples described herein.

As further illustrated in FIG. 25, the example system 2500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2502 may assume a variety of different configurations, such as for computer 2514, mobile 2516, and television 2518 uses. Each of these configurations includes devices that may have generally different constructs and capabilities, and thus the computing device 2502 may be configured according to one or more of the different device classes. For instance, the computing device 2502 may be implemented as the computer 2514 class of a device that includes a personal computer, desktop computer, a multi-screen computer, laptop computer, netbook, and so on.

The computing device 2502 may also be implemented as the mobile 2516 class of device that includes mobile devices, such as a mobile phone, portable music player, portable gaming device, a tablet computer, a wearable device, a multi-screen computer, and so on. The computing device 2502 may also be implemented as the television 2518 class of device that includes devices having or connected to generally larger screens in casual viewing environments. These devices include televisions, set-top boxes, gaming consoles, and so on.

The techniques described herein may be supported by these various configurations of the computing device 2502 and are not limited to the specific examples of the techniques described herein. For example, functionalities discussed with reference to the client device 102 and/or the ink module 118 may be implemented all or in part through use of a distributed system, such as over a "cloud" 2520 via a platform 2522 as described below.

The cloud 2520 includes and/or is representative of a platform 2522 for resources 2524. The platform 2522 abstracts underlying functionality of hardware (e.g., servers) and software resources of the cloud 2520. The resources 2524 may include applications and/or data that can be utilized while computer processing is executed on servers that are remote from the computing device 2502. Resources 2524 can also include services provided over the Internet and/or through a subscriber network, such as a cellular or Wi-Fi network.

The platform 2522 may abstract resources and functions to connect the computing device 2502 with other computing devices. The platform 2522 may also serve to abstract scaling of resources to provide a corresponding level of scale to encountered demand for the resources 2524 that are implemented via the platform 2522. Accordingly, in an interconnected device embodiment, implementation of functionality described herein may be distributed throughout the system 2500. For example, the functionality may be implemented in part on the computing device 2502 as well as via the platform 2522 that abstracts the functionality of the cloud 2520.

Discussed herein are a number of methods that may be implemented to perform techniques discussed herein. Aspects of the methods may be implemented in hardware, firmware, or software, or a combination thereof The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1: A system for processing ink according to a current ink mode, the system comprising: one or more processors; and one or more computer-readable storage media storing computer-executable instructions that, responsive to execution by the one or more processors, cause the system to perform operations including: detecting a pen in proximity to an input surface; ascertaining a current ink mode from multiple different ink modes for the system responsive to said detecting; causing a visual affordance identifying the current ink mode to be displayed responsive to said ascertaining; and processing ink content applied to the input surface according to the current ink mode.

Example 2: A system as described in example 1, wherein the visual affordance comprises a hover target displayed beneath a tip of the pen when the pen is hovered over the input surface, and wherein the different ink modes have different respective hover targets.

Example 3: A system as described in one or more of examples 1 or 2, wherein the visual affordance comprises an ink flag that includes a visual indicator identifying the current ink mode, and where the different ink modes have different respective visual indicators.

Example 4: A system as described in one or more of examples 1-3, wherein the visual affordance comprises an ink flag that includes a visual indicator identifying the current ink mode, and wherein the ink flag is selectable to cause an ink menu to be displayed that includes multiple selectable indicia that are selectable to cause different ink-related actions to be performed.

Example 5: A system as described in one or more of examples 1-4, wherein ink content is applied to a document that includes primary content, the current ink mode comprises a transient ink mode, and wherein said processing comprises propagating the ink content to a transient ink layer that is separate from the primary content of the document.

Example 6: A system as described in one or more of examples 1-5, wherein the ink content is applied to a document that includes primary content, the current ink mode comprises a transient ink mode, and wherein said processing comprises: detecting that the pen is removed from proximity to the input surface; initiating a timer responsive to said detecting; and removing the ink content from the document and propagating the ink content to a transient layer for the document responsive to expiry of the timer.

Example 7: A system as described in one or more of examples 1-6, wherein the ink content is applied to a document that includes primary content, the current ink mode comprises a transient ink mode, and wherein said processing comprises propagating the ink content to a transient ink layer that is separate from the primary content of the document, the document having multiple different transient ink layers that each include different ink content.

Example 8: A system as described in one or more of examples 1-7, wherein the ink content is applied to a document that includes primary content, the current ink mode comprises a transient ink mode, and wherein said processing comprises propagating the ink content to a transient ink layer that is separate from the primary content of the document, the document having multiple different transient ink layers that each include different ink content and that are each associated with different users that provide ink content to the document.

Example 9: A system as described in one or more of examples 1-8, wherein the ink content is applied to a document that includes primary content, the current ink mode comprises a transient ink mode, and wherein said processing comprises: removing the ink content from the document; propagating the ink content to a transient ink layer that is separate from the primary content of the document; receiving user input to invoke the transient ink layer; and causing the transient ink layer to be retrieved such that the ink content is at least temporarily displayed as part of the document.

Example 10: A system as described in one or more of examples 1-9, wherein the ink content is applied to a document that includes primary content, the current ink mode comprises a transient ink mode, and wherein said processing comprises: receiving transient ink content to the document from multiple different users; propagating the transient ink content from each user to a different respective transient ink layer for the document; causing visual affordances of the different transient ink layers to be displayed; and enabling each transient ink layer to be individually accessible.

Example 11: A system as described in one or more of examples 1-10, wherein said processing comprises: recording the ink content as it is generated; receiving a request to playback the ink content; and causing playback of at least a portion of the ink content, the playback including an animation that reproduces the portion of the ink content.

Example 12: A system as described in one or more of examples 1-11, wherein said processing comprises: recording the ink content as it is generated;

causing playback of at least a portion of the ink content; detecting that new ink content is added while a playback mode for the ink content is active; and inserting the new ink content into the stored ink content.

Example 13: A system as described in one or more of examples 1-12, wherein the operations further include: receiving a user selection of the ink content; ascertaining that an ink note functionality is invoked; and populating the selected ink content to an ink note responsive to said ascertaining.

Example 14: A computer-implemented method for propagating ink to a transient layer of a document, the method comprising: receiving ink content applied to a document via input from a pen to an input surface while in a transient ink mode; detecting that the pen is removed from proximity to the input surface; initiating a timer responsive to said detecting; and removing the ink content from the document and propagating the ink content to a transient layer for the document responsive to expiry of the timer.

Example 15: A computer-implemented method as described in example 14, wherein said detecting comprises detecting that the pen is not in contact with the input surface and that the pen is not hovered over the input surface.

Example 16: A computer-implemented method as described in one or more of examples 14 or 15, further comprising causing a visual indication of the transient ink mode to be displayed, the visual indication including an indication that the timer is elapsing.

Example 17: A computer-implemented method as described in one or more of examples 14-16, further comprising: causing a visual affordance of the transient ink layer to be displayed; and enabling the transient ink layer to be accessible via interaction with the visual affordance.

Example 18: A computer-implemented method for capturing an annotation layer of a document, the method comprising: monitoring for changes to primary content of a document that includes an ink annotation; ascertaining that a threshold change occurs to the primary content; capturing an annotation layer for the document that includes the annotation and a version of the primary content prior to the threshold change; and enabling the annotation layer to be accessed separately from a current version of the document.

Example 19: A computer-implemented method as described in example 18, further comprising causing a visual affordance identifying the annotation layer to be displayed along with the current version of the document.

Example 20: A computer-implemented method as described in one or more of examples 18 or 19, further comprising receiving a request to present the annotation layer; and causing the annotation layer to be presented separately from the current version of the document.

CONCLUSION

Techniques for ink modes are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising: one or more processors; and one or more computer-readable storage media storing computer-executable instructions that, responsive to execution by the one or more processors, cause the system to perform operations including: detecting a pen in proximity to an input surface of a display device on which primary content is displayed; ascertaining a current ink mode from multiple different ink modes for the system responsive to said detecting, the different ink modes including a permanent ink mode in which ink applied becomes part of the primary content and a transient ink mode in which ink applied to the primary content is applied to a transient ink layer separate from the primary content and does not become part of the primary content, and the current ink mode corresponding to the transient ink mode; causing a visual affordance identifying the transient ink mode to be displayed on the display device responsive to said ascertaining; processing ink content applied to the primary content according to the transient ink mode, including: detecting that the pen is removed from proximity to the input surface; initiating a timer responsive to said detecting; propagating the ink content to the transient ink layer that is retrievable separate from the primary content; and removing the ink content from being displayed on the document responsive to expiry of the timer, the visual affordance being selectable to cause the ink content to be retrieved from the transient ink layer and displayed along with the primary content.

2. The system as described in claim 1, further comprising displaying a hover target beneath a tip of the pen responsive to detecting the pen in proximity to the input surface, and wherein the different ink modes have different respective hover targets.

3. The system as described in claim 1, wherein the visual affordance comprises an ink flag that includes a visual indicator identifying the current ink mode, and where the different ink modes have different respective visual indicators.

4. The system as described in claim 1, wherein the visual affordance comprises an ink flag that includes a visual indicator identifying the current ink mode, and wherein the ink flag is selectable to cause an ink menu to be displayed that includes multiple selectable indicia that are selectable to cause different ink-related actions to be performed.

5. The system as described in claim 1, wherein the primary content has multiple different transient ink layers that each include different ink content.

6. The system as described in claim 1, wherein the primary content has multiple different transient ink layers that each include different ink content and that are each associated with different users that provide ink content to the primary content.

7. The system as described in claim 1, wherein said processing comprises:
receiving user input to retrieve ink content from the transient ink layer; and
causing the transient ink layer to be retrieved such that the ink content is at least temporarily displayed with the primary content.

8. The system as described in claim 1, wherein said processing comprises:
receiving transient ink content to the primary content from multiple different users;
propagating the transient ink content from each user to a different respective transient ink layer for the primary content;
causing visual affordances of the different transient ink layers to be displayed; and
enabling each transient ink layer to be individually accessible.

9. The system as described in claim 1, wherein said processing comprises:
recording the ink content as it is generated;
receiving a request to playback the ink content; and
causing playback of at least a portion of the ink content, the playback including an animation that reproduces the portion of the ink content.

10. The system as described in claim 1, wherein said processing comprises:
recording the ink content as it is generated;
causing playback of at least a portion of the ink content;
detecting that new ink content is added while a playback mode for the ink content is active; and
inserting the new ink content into the stored ink content.

11. The system as described in claim 1, wherein the operations further include:
receiving a user selection of the ink content;
ascertaining that an ink note functionality is invoked; and populating the selected ink content to an ink note responsive to said ascertaining.

12. A computer-implemented method, comprising:
receiving ink content applied to a document via input from a pen to an input surface while in a transient ink mode, the transient ink mode effective to cause ink applied to the document to be applied to a transient ink layer separate from the document such that the ink does not becoming part of primary content of the document;
detecting that the pen is removed from proximity to the input surface;
initiating a timer responsive to said detecting;
removing the ink content from being displayed on the document and propagating the ink content to the transient ink layer for the document responsive to expiry of the timer; and
displaying a visual representation of a user, the visual representation being selectable to retrieve the transient ink layer and cause the ink content from the transient ink layer to be displayed along with the primary content.

13. A computer-implemented method as recited in claim 12, wherein said detecting comprises detecting that the pen is not in contact with the input surface and that the pen is not hovered over the input surface.

14. A computer-implemented method as recited in claim 12, further comprising causing a visual indication of the transient ink mode to be displayed, the visual indication including an indication that the timer is elapsing.

15. A computer-implemented method as recited in claim 12, further comprising:
causing a visual affordance of the transient ink layer to be displayed; and
enabling the transient ink layer to be accessible via interaction with the visual affordance.

16. A computer-implemented method, comprising:
monitoring for changes to primary content of a document that includes an ink annotation;
ascertaining that a threshold change occurs to the primary content based on the ink annotation being a threshold distance from the primary content;
creating an annotation layer for the document that includes saving the ink annotation and a snapshot of the primary content prior to the threshold change to the annotation layer and removing the ink annotations from the primary content; and
enabling the annotation layer to be accessed separately from a current version of the document.

17. A computer-implemented method as recited in claim 16, further comprising causing a visual affordance identifying the annotation layer to be displayed along with the current version of the document.

18. A computer-implemented method as recited in claim 16, further comprising
receiving a request to present the annotation layer; and
causing the annotation layer to be presented separately from the current version of the document.

19. A computer-implemented method as recited in claim 16, further comprising causing a visual affordance to be displayed including a layer count identifying a number of annotation layers linked to the primary content.

20. A computer-implemented method as recited in claim 16, wherein the threshold distance is measured in one of the group: pixels, distance on a display, and distance with reference to a section of the document.

* * * * *